(12) United States Patent
Steenblik et al.

(10) Patent No.: US 7,221,845 B2
(45) Date of Patent: May 22, 2007

(54) PLANAR OPTICAL WAVEGUIDE

(75) Inventors: Richard A. Steenblik, Alpharetta, GA (US); Mark J. Hurt, Duluth, GA (US)

(73) Assignee: Nanoventions, Inc., Alpharetta, GA (US)

( * ) Notice: Subject to any disclaimer, the term of this patent is extended or adjusted under 35 U.S.C. 154(b) by 0 days.

(21) Appl. No.: 11/257,750

(22) Filed: Oct. 24, 2005

(65) Prior Publication Data

US 2006/0098929 A1    May 11, 2006

Related U.S. Application Data

(63) Continuation of application No. 10/439,680, filed on May 16, 2003, now Pat. No. 6,959,138.

(60) Provisional application No. 60/381,325, filed on May 17, 2002.

(51) Int. Cl.
*G02B 6/124* (2006.01)
*G02B 6/12* (2006.01)

(52) U.S. Cl. .......................................... 385/131; 385/37

(58) Field of Classification Search ................... 385/37
See application file for complete search history.

(56) References Cited

U.S. PATENT DOCUMENTS 5,861,113 A * 1/1999 Choquette et al. .......... 264/1.24

* cited by examiner

*Primary Examiner*—Michelle Connelly-Cushwa
(74) *Attorney, Agent, or Firm*—Thomas, Kayden, Horstemeyer & Risley LLP; Todd Deveau

(57) ABSTRACT

A method for creating a master and for generating an optical waveguide therefrom. The method includes creating a waveguide master having the geometrical form of at least one optical element formed therein; and generating an embossed optical waveguide from the master, the embossed optical waveguide being a negative of the master, the embossed optical waveguide having an optical element formed therein which corresponds to and is a negative of the geometrical form of the optical element formed in the master, the embossed optical waveguide being formed of a polymer material having a first index of refraction, wherein the optical element is formed in the polymer material and creates a local modification of the refractive index of the polymer material.

17 Claims, 20 Drawing Sheets

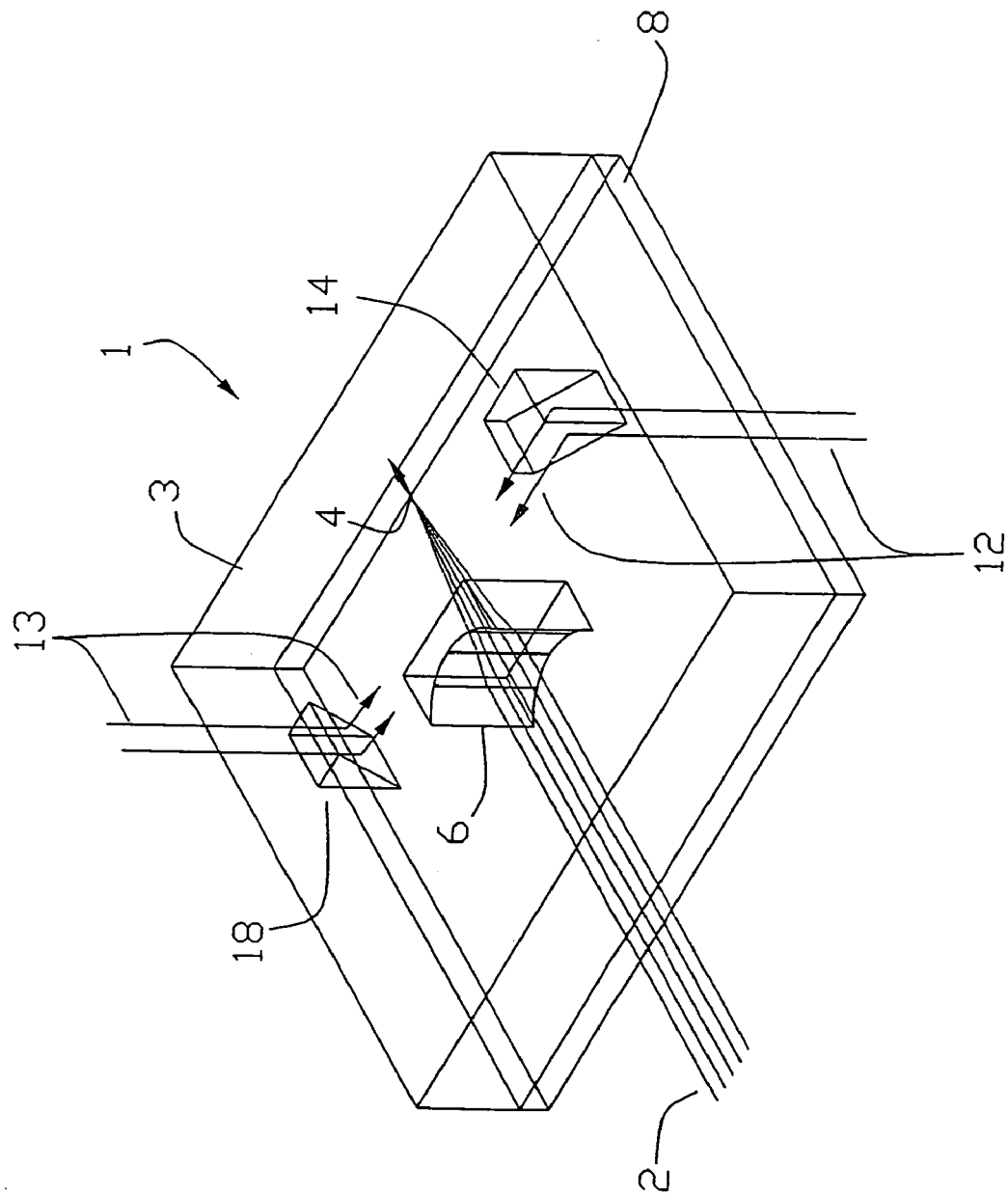

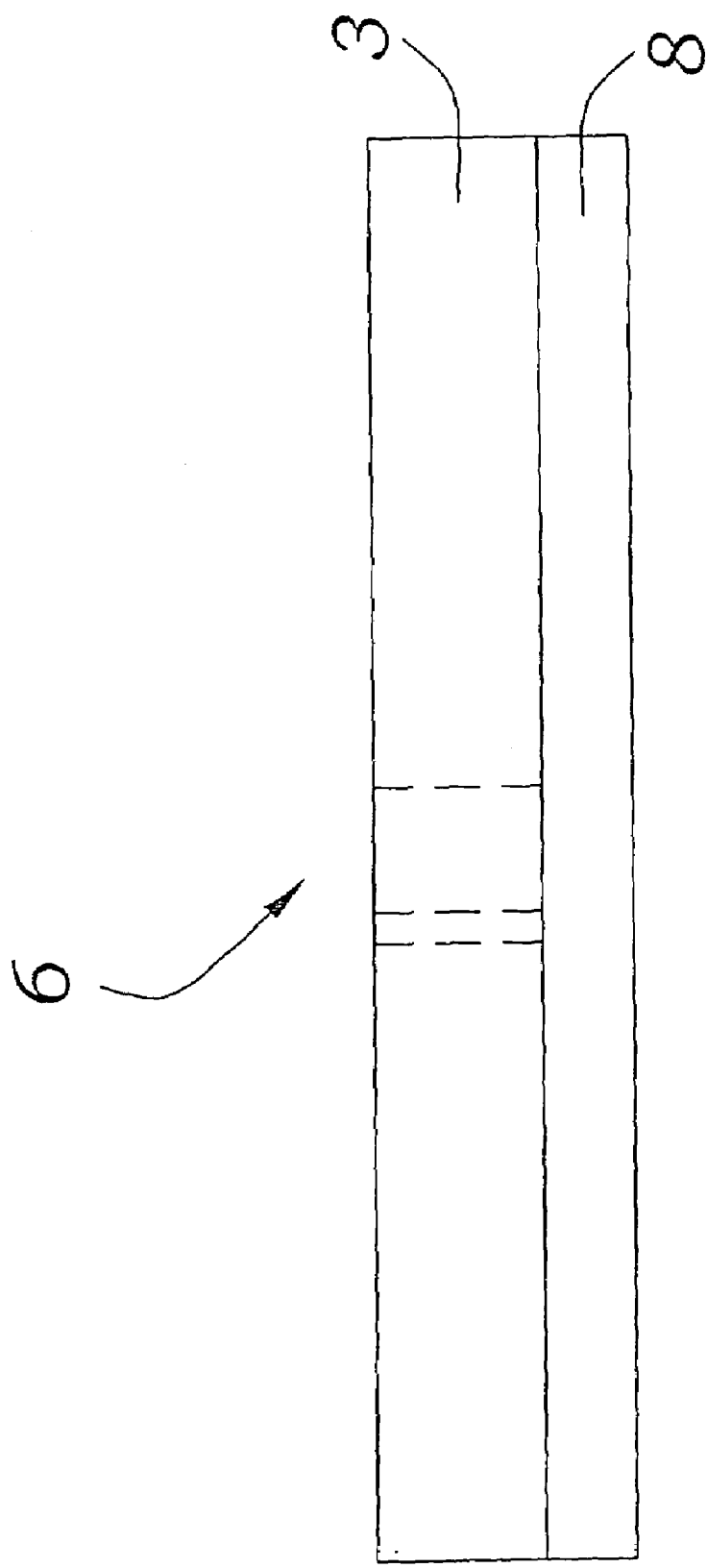

PLANAR OPTICAL WAVEGUIDE

RELATED APPLICATION

This application is a continuation of U.S. patent application 10/439,680, filed May 16, 2003 now U.S. Pat. No. 6,959,138, which claims priority from and the benefit of U.S. Provisional Patent Application Ser. No. 60/381,325 filed May 17, 2002.

FIELD OF THE INVENTION

The present invention relates to an optical waveguide having optical elements formed therein and, more particularly, to a polymer optical waveguide for light transmission having optical elements formed therein for optical computing, optical processing, and light control providing defined optical pathways, and a method for creating a master optical waveguide and for producing the polymer optical waveguide therefrom.

BACKGROUND OF THE INVENTION

It is generally known in the art that an optical waveguide can be created by placing layers of materials in contact with each other which have different indices of refraction such that light focused in the layer of material having the higher index of refraction will remain in that layer due to total internal reflection of the light at the boundaries between the higher index of refraction material and the materials having lower indices of refraction. There are several patents which teach this general concept. For example, Sugano et al., U.S. Pat. No. 4,015,893, discloses a method for creating light transmission paths on a compound semiconductor surface. Isolation zones are formed on the surface of a substrate by plasma oxidation which causes an oxide film having a different refractive index than the substrate to be selectively formed thereon. The refractive index of the isolation zones gradually decreases from the boundary face between the substrate and the film toward the outer surface of the film. These isolation zones constitute the light transmission paths.

Sugano et al, also disclose epitaxially growing a $GaAs_{0.6}P_{0.4}$ compound semiconductor layer on a GaAs substrate forming the isolation zones in the $GaAs_{0.6}P_{0.4}$ layer such that the isolation zones arrive at the GaAs substrate. The refractive index of the oxide film gradually decreases laterally away from the $GaAs_{0.6}P_{0.4}$ channels such that light entering the oxide film propagates into the $GaAs_{0.6}P_{0.4}$ channel.

Spillman, Jr., et al., U.S. Pat. No. 4,547,262, disclose a method for fabricating optical waveguides in $LiTaO_3$. A masking pattern is first formed on the surface of the substrate, the substrate surface having the masking pattern thereon is immersed in benzoic acid whereby a proton exchange process occurs which increases the extraordinary component of the refractive index in the unmasked area of the substrate. The substrate is then heated to transform the step index profile produced by the benzoic acid reaction into a gradient index profile having a lowered value of refractive index at the guide surface. The unmasked, altered areas of the substrate comprise the optical waveguides. Spillman Jr., et al. also disclose forming optical elements such as lenses, mirrors, prisms, and diffraction gratings in the planar waveguide formed by the above-discussed method.

Suzuki et al., U.S. Pat. No. 4,983,499, disclose a method for forming a lens in a planar optical waveguide. The planar waveguide is covered with a layer of photoresist which is exposed through a photo mask and developed to form the photoresist mask. The mask has a multiplicity of separate openings and the density of openings per unit area is continuously varied. A material such as titanium is then deposited on the non-masked areas of the surface of the waveguide. The masking positions of the photoresist are then removed thereby leaving only selected areas of the waveguide covered with titanium. The titanium is then thermally diffused into the waveguide to produce a gradient refractive index region in the waveguide which corresponds to the lens.

In another embodiment, Suzuki et al, disclose depositing the titanium layer onto the surface of the waveguide and depositing a layer of photoresist on top of the titanium. The photoresist is masked, exposed and developed thereby leaving openings in the photoresist layer, the density of the openings per unit area being continuously varied. The exposed titanium is etched and the remaining photoresist is subsequently removed, thereby leaving selected areas of the waveguide covered with titanium. The titanium is then diffused into the waveguide to form a gradient refractive index region which corresponds to the lens.

Although the concept of creating optical waveguides and forming optical components in the waveguides is generally known, a need exists in the art for an optical waveguide that can be relatively easily and inexpensively produced.

The process of creating a gradient refractive index area in a material is not, in and of itself, new. For example, Borrelli, et al., U.S. Pat. No. 4,403,031, disclose a method for forming optical patterns in glass by creating optical density and/or refractive index variation in porous glass. The patterns are formed by impregnating a portion of the porous glass with a photolyzable organometallic compound and exposing at least the impregnated portion to photolyzing light to cause photolytic decomposition of the organometallic compound to a photolyzed metal-organic intermediate in a pattern corresponding to the exposure. As discussed above, Spillman, Jr., et al. utilize a proton exchange process to increase the extraordinary component of the refractive index in the unmasked area of a substrate. Once the substrate is heated, the step index profile is transformed into a gradient index profile having a lower value of refractive index at the waveguide surface. Suzuki, et al supra, disclose altering the index of refraction of selected areas of the waveguide by thermally diffusing titanium into the waveguide to produce a gradient refractive index region in the waveguide which corresponds to the lens.

None of the above prior art teaches or suggests forming an optical waveguide from at least two polymer layers which have different indices of refraction. Also, none of the prior art teaches or suggests creating optical elements in a waveguide by methods similar to those of the present invention. Furthermore, none of the prior teaches or suggests fabricating a master waveguide having shaped optical elements formed therein and producing polymer optical waveguides from the master. Moreover, none of these references teach or suggest piercing ¼ wavelength diameter, or smaller, holes into the surface of a polymer layer to create a gradient refractive index lens or other optical element, as is taught by the present invention.

SUMMARY OF THE INVENTION

In accordance with the present invention, a planar waveguide master having the physical form of optical elements formed therein is produced and polymer replicas are easily and inexpensively generated therefrom. This allows optical waveguides having optical components formed therein to be mass-produced.

In an exemplary embodiment of the present invention, a layer of liquid energy curing polymer is exposed to ionizing radiation through a mask consisting of transmitting and opaque areas. The opaque areas in the mask correspond to areas in the liquid polymer which will not be exposed to the ionizing radiation. During exposure, the areas in the liquid polymer which are exposed through the transmitting areas in the mask to ionizing radiation become cured, or hardened. The areas which are not exposed to the ionizing radiation do not become cured and subsequently are washed away with a chemical rinse. The resulting structure is a cured layer of polymer having shaped holes pierced through it, the cured layer of polymer being bonded to a polymeric substrate such as polypropylene. The shaped holes pierced through the polymer layer correspond to optical elements formed in the polymer layer. Alternatively, these optical elements can be formed in the layer of polymer, after it is cured, by reactive ion etching or ion beam milling. The formed polymer layer, which in one embodiment has an index of refraction of approximately 1.55 or greater, can be placed in contact with or bonded to a substrate, such as polypropylene, which having an index of refraction, for example, of approximately 1.50 or less. Since the refractive index of air is approximately 1.0, the formed polymer layer is sandwiched between two layers of low refractive index material. The polymer layer having the optical elements formed therein does not have to be bonded to a substrate but can function as a free-standing planar optical waveguide wherein air on both sides of the waveguide creates the required refractive index differential. The differences between the indices of refraction cause light projected into the formed polymer layer to be guided through the formed polymer layer by total internal reflection. The formed polymer layer therefore functions as a planar waveguide and the shaped holes function as optical elements in the waveguide plane.

The formed polymer layer having the optical elements formed therein can be used as a master from which additional polymer optical waveguides can be produced. For example, a replica polymer waveguide can be produced by, placing a layer of polymer in contact therewith, solidifying the polymer layer, and separating the solidified layer of polymer.

In accordance with another embodiment of the present invention, once the polymer master has been created, a nickel master can be produced by electroplating the polymer master. In order to produce an embossed optical waveguide, a layer of liquid polymer is placed in contact with the master. For example, a substrate such as a layer of polypropylene is placed in contact with the layer of liquid polymer. The liquid polymer can be an ionizing radiation curing material that is solidified by exposure to ultraviolet light or to an electron beam, or the liquid polymer can solidify by a chemical reaction, such as a two-part epoxy, urethane, or acrylic, or the liquid polymer may be a thermoplastic that solidifies by cooling. After the liquid polymer has been solidified by the appropriate means it becomes bonded to the substrate. The formed polymer waveguide is then separated from the master. The polymer waveguide thus formed is a planar waveguide that is a negative of the form of the master.

The present invention also discloses novel methods for creating optical elements in the planar waveguide of the present invention. For example, once an optical planar waveguide has been created in accordance with the methods of the present invention, optical elements may be formed therein by selectively altering the refractive index of the waveguide material in particular locations by piercing holes in the waveguide which have diameters which are generally on the order of ¼ of the wavelength, or less, of the light being projected into the waveguide to form gradient refractive index areas. Since the holes are small in comparison to the wavelength of light, the light interacts with the pierced area of the waveguide as having a bulk property, or averaged index of refraction, over the pierced area. Different types of optical elements can be created by this method.

When we refer to a "liquid polymer" or a "liquid energy curing polymer", we are referring to energy curing polymers (such as both UV and electron beam cured polymers), reactive polymer systems (such as epoxies, urethanes and acrylics), and thermoplastics (such as polypropylenes, polyethylenes, amorphous, PET, and acrylics).

The present invention further provides replicated polymer waveguide planar optical films for document authentication and the prevention of counterfeiting.

These advantages of the present invention will be apparent from the foregoing discussion.

BRIEF DESCRIPTION OF THE DRAWINGS

Many aspects of the invention can be better understood with reference to the following drawings. The components in the drawings are not necessarily to scale. Moreover, in the drawings, like reference numerals designate corresponding parts throughout the several views.

FIG. 1 illustrates a perspective view of the planar optical waveguide of the present invention in accordance with an examplary embodiment.

FIG. 2 illustrates a cross-sectional view of the optical waveguide of FIG. 1 showing optical element 6 formed therein.

FIG. 5b illustrates a cross-sectional view of a multi-layer, dielectric mirror comprised in the optical waveguide of FIG. 5a.

FIG. 14b illustrates an enlarged plan view of the anti-reflection structures shown in FIG. 14a.

DETAILED DESCRIPTION OF THE INVENTION

Figure 3A:
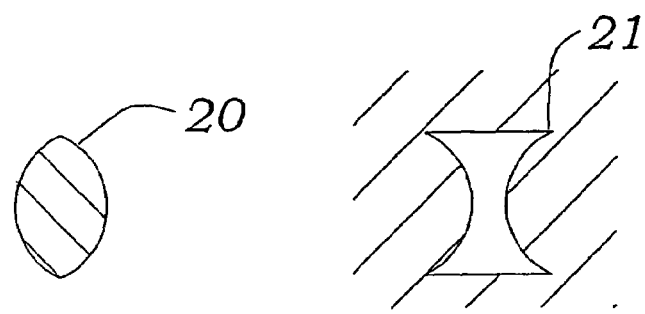
FIGS. 3a–3d illustrate top plan views of conventional lenses formed of solid material and their equivalents formed as air slots in the optical waveguide of the present invention.
Figure 3B:
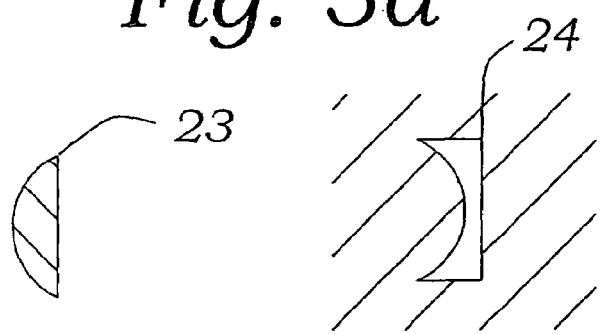
Figure 3C:
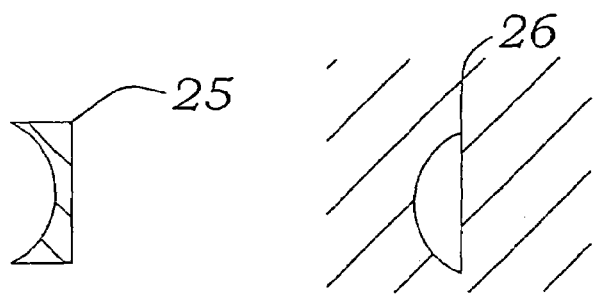
Figure 3D:
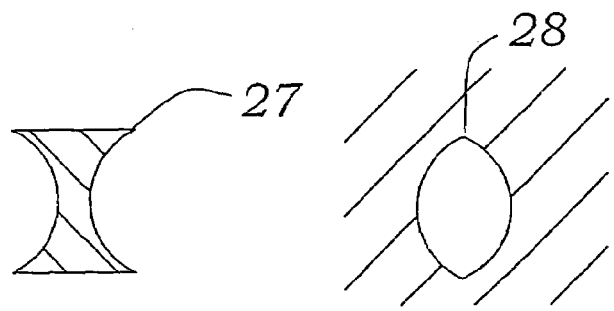

FIG. 1 illustrates the optical waveguide 1 of the present invention. Optical elements 6, 14 and 18 represent examples of the types of optical elements that can be formed in the optical waveguide 1. Light 2, 12, 13 projected into the light control device is manipulated by the optical elements in a predetermined manner. The optical elements are designed to receive light from a particular direction and to control the light in accordance with their optical properties. Therefore, the optical waveguide 1 can be created such that light projected into the optical waveguide from any predetermined direction will be received by an optical element and controlled in accordance with the optical characteristics of the particular optical element. The optical element that receives the light projected into the device will manipulate the light and transmit the light to other optical elements that further manipulate the light in accordance with their optical characteristics.

The optical waveguide 1 of FIG. 1 is typically comprised of a first layer of material 3 that has a relatively high index of refraction and a substrate 8 that has a relatively low index of refraction. The light 2 projected into layer 3 will be optically guided in layer 3 by total internal reflection which results from layer 3 being located between two mediums with low indices of refraction, i.e., substrate 8 and air. The differences between the indices of refraction will determine the critical angle at which total internal reflection within layer 3 occurs. It is also possible to cover the top surface of layer 3 with a relatively low refractive index material as an alternative to air in addition to covering the bottom surface with low refraction index material.

When referring to polymer layer 3 as having a relatively high index of refraction and substrate 8 as having a relatively low index of refraction what is meant is the index of refraction of the polymer layer 3 relative to the index of refraction of substrate 8.

In an exemplary embodiment layer 3 is a layer of polymer having an index of refraction of approximately 1.55 or greater. Substrate 8 is a polymer that has in index of refraction of approximately 1.50 or less. The refractive index of air is 1.0. The differences between the indices of refraction of layer 3 and substrate 8 will determine the critical angle for total internal reflection. Since the direction of light 2 projected into the waveguide can be controlled such that it is projected substantially parallel to the plane of layer 3, the relative difference between the refractive indices of layer 3 and substrate 8 of 0.05 is more than sufficient to cause total internal reflection.

Polymer layer 3 can be formed by taking a layer of liquid energy curing polymer and exposing it to patterned ionizing radiation. Optical elements 6, 14 and 18 are areas of polymer that are not exposed to the ionizing radiation. A mask (not shown) consisting of transmitting and opaque areas is used to mask certain areas of liquid polymer layer 3 during exposure to ionizing radiation. The opaque areas in the mask correspond to the areas in the liquid polymer that are not exposed to ionizing radiation. During exposure, the areas in the liquid polymer that are exposed to ionizing radiation become cured, or hardened. The areas that are not exposed do not become cured and are subsequently washed away with a chemical rinse. The resulting structure is a cured layer of polymer having holes pierced through it. The shapes of the holes correspond to the shapes of the opaque areas in the mask. As shown in FIG. 2, these shapes are pierced through layer 3 but not substrate 8.

Suitable examples of energy-cured polymers include polymers cured by both ultraviolet and electron beam cured systems. Thus, for example, the polymer layer 3 may be formed or cured by selectively exposing it to ultraviolet (UV) light. Alternatively, the optical elements can be formed in a layer of energy-cured polymer 3 by reactive ion etching or ion beam milling. The technique used to create an optical element depends on the desired shape of the optical element. Additionally, polymer layer 3 can be formed of reactive polymer systems, such as epoxies, urethanes and acrylics, by forming or solidifying polymer layer 3 by chemical reaction. Further, polymer layer 3 can consist of a thermoplastic polymer that is formed or solidified by cooling. Suitable thermoplastic polymers include polypropylene, polyethylene, amorphous PET and acrylics.

Optical element 6 of FIG. 1 is a hole shaped like a planar concave lens. Since light passing through the lens is propagating from a high refractive index region into a low refractive index region (air), the lens behaves like a conventional planar convex lens wherein light propagates from a low refractive index region (air) into a high refractive index region (the lens). FIGS. 3a–3d illustrate conventional lenses 20, 23, 25 and 27 formed of solid material and their equivalents formed as slots of air (or low refractive index material) 21, 24, 26, 28 in the polymer layer 3. Optical element 18 in FIG. 1 is a right-angle prism wherein the angle of the surface upon which light 13 is impinging is sufficient to cause the light to be totally reflected into polymer layer 3. Light 13 impinges on the upper surface of layer 3 in a direction normal to the surface. Optical element 14 is also a right-angle prism that receives light 12 directed at the bottom surface of polymer layer 3 in a direction normal to the surface. The light 12 is totally reflected into polymer layer 3 and guided through the layer by total internal reflection. In a similar manner, optical elements can also be formed in layer 3 which reflect light back out of the optical waveguide as discussed below with respect to FIG. 9, for example.

FIG. 2 illustrates a cross-sectional view of the optical waveguide of FIG. 1 having lens 6 formed therein. Preferably, the optical elements formed in layer 3 extend through layer 3 and are bottomed out against substrate 8. Alternatively, a controlled gap (not shown) can be created between the bottom of the optical elements and substrate 8. When light propagating through layer 3 exits the polymer into air at lens 6, a small amount of the light will be drawn into substrate 8 since the substrate 8 has a higher refractive index than air. By creating a controlled gap of polymer between optical element 6 and substrate 8, the light will see an average refractive index of the refractive indices of air and the polymer. By controlling the thickness of this gap to produce an average refractive index slightly higher than the refractive index of substrate 8 but lower than the refractive index of layer 3, the amount of light drawn into the substrate 8 will be minimized.

Figure 4:
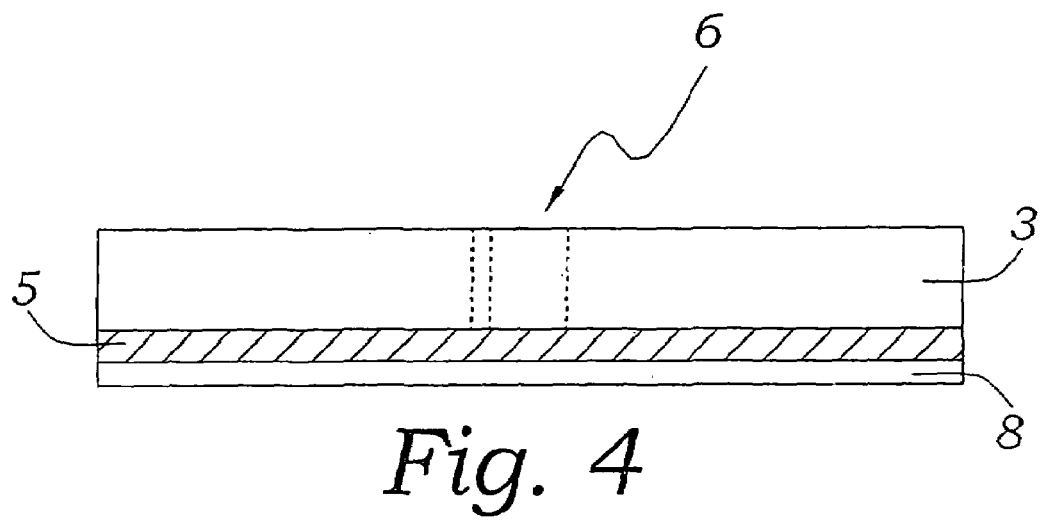
FIG. 4 illustrates a cross-sectional view of the optical waveguide of the present invention in accordance with an alternative embodiment.

FIG. 4 illustrates a cross-sectional view of an alternative embodiment of the optical waveguide 1 of the present invention (only showing optical element 6) wherein a highly reflective metalization layer 5, such as aluminum or silver, is formed between substrate 8 and polymer layer 3. Any light which propagates toward the metalization layer 5 will be reflected and, therefore, remain in the polymer layer 3. A possible disadvantage to incorporating a metalization layer into the structure is that some of the light energy may be absorbed by the metalization layer 5 upon reflection.

Figure 5A:
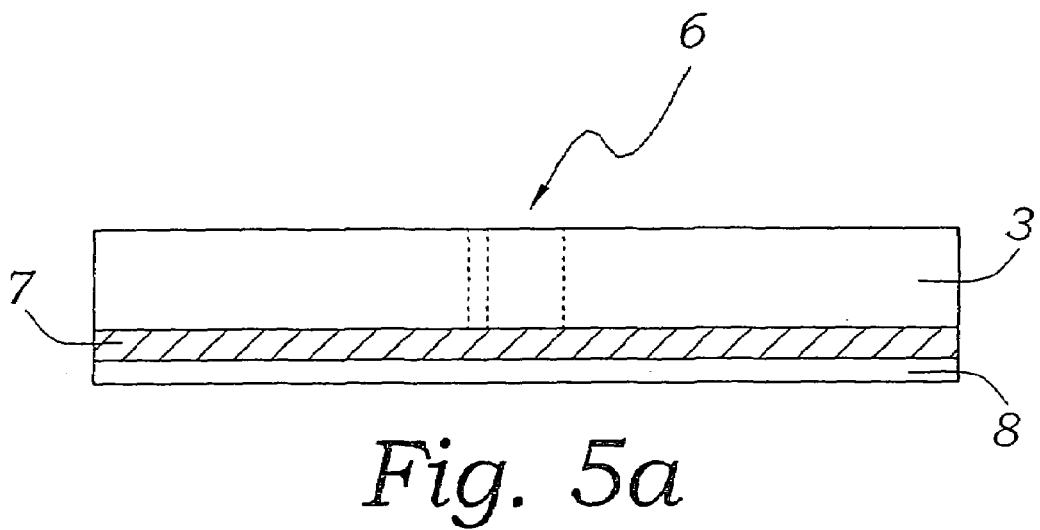
FIG. 5a illustrates a cross-sectional view of the optical waveguide of the present invention in accordance with another embodiment.
Figure 5B:
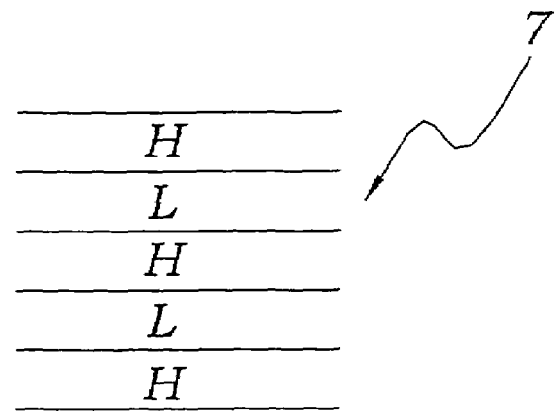

FIG. 5a illustrates a cross-sectional view of another embodiment of the optical waveguide 1 wherein a multilayer dielectric mirror 7 is deposited on the substrate 8. The multi-layer dielectric mirror 7 serves as an interference barrier between the polymer layer 3 and the top high refractive index layer of the multi-layer dielectric mirror 7. When the light propagating in polymer layer 3 exits into the air at optical element 6, the multi-layer dielectric mirror 7 will reflect the light so that it continues to propagate across the air gap, and into polymer layer 3. FIG. 5b illustrates an enlarged cross-sectional view of the multilayer, dielectric mirror 7. Although the dielectric mirror will reflect light of a particular wavelength, in accordance with the spacing and width of the layers, very little energy is lost to absorption since the mirror is nonconductive. A Fabry-Perot interference filter structure can be used for high efficiency reflection.

Figure 6A:
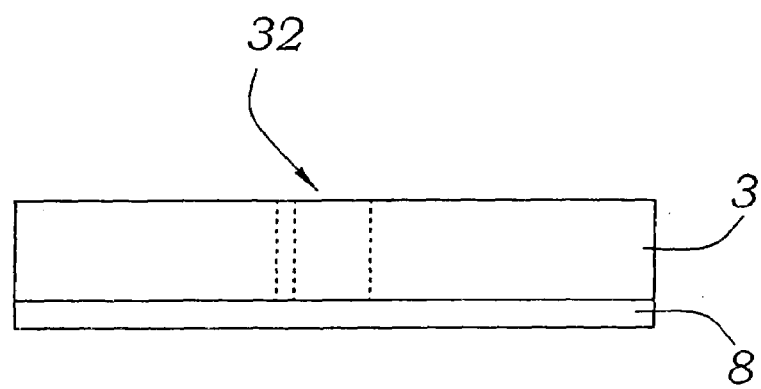
FIG. 6a illustrates a cross-sectional view of the optical waveguide of the present invention having an optical element formed therein in accordance with one embodiment of the present invention for creating the optical elements and the optical waveguide.

FIG. 6a illustrates a cross-sectional view of an alternative embodiment for creating the optical elements of the present invention that are formed in polymer layer 3. In this embodiment, optical element 32 is created by piercing very small holes in polymer layer 3 which have diameters that are generally on the order of ¼ of the wavelength of the light or less. Since the holes are small in comparison to the wavelength of light, the light reacts with the pierced area of the material as having a bulk property, or averaged index of refraction, over the pierced area. Thus, the index of refraction of a particular area of layer 3 can be altered by piercing tiny holes in layer 3. In areas where the numbers of holes is greater, the refractive index will be lower, in areas where there are fewer holes, the index of refraction will be higher.

Figure 6B:
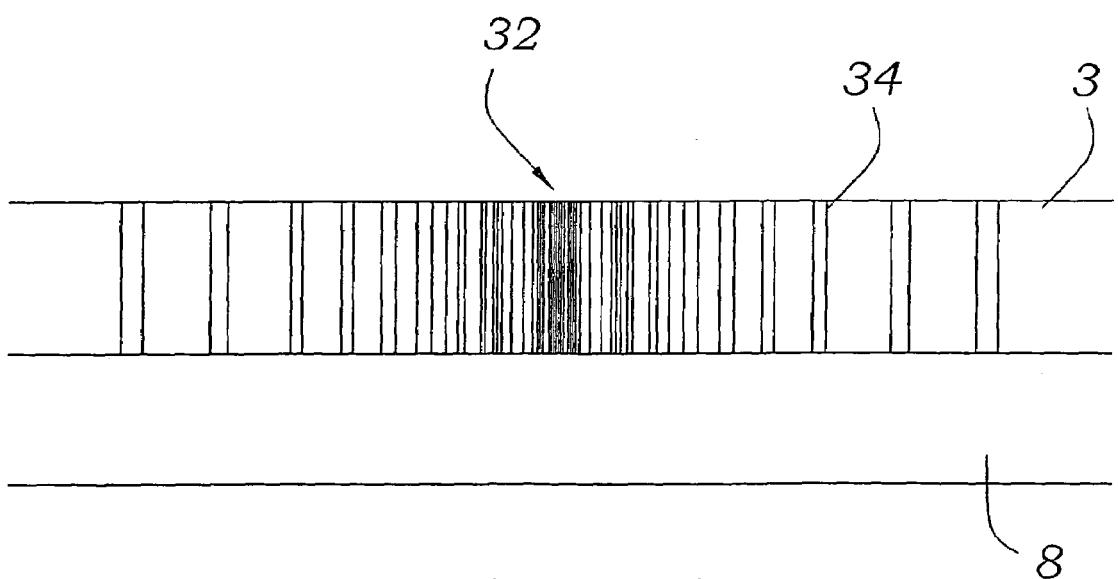
FIG. 6b illustrates an expanded cross-sectional view of the optical waveguide of FIG. 6a wherein the optical element formed in the optical waveguide is a converging lens.

FIG. 6b is an expanded cross-sectional view of optical element 32. The number of holes 34 pierced through polymer layer 3 is greatest at the center of optical element 32 and it decreases toward the outer edges of optical element 32. Therefore, the index of refraction will be lowest in the center of the altered area and it will increase toward the outer edges of the altered area. Light propagating through optical element 32 in a direction perpendicular to the plane of the Figure will move fastest in the low refractive index region, thereby causing the light to be refracted into the high refractive index region. The optical element 32 of FIG. 6b is a diverging lens because the light diverges away from the center of the altered area as it propagates through the optical element 32 in a direction substantially perpendicular to the plane of the Figure.

Figure 6C:
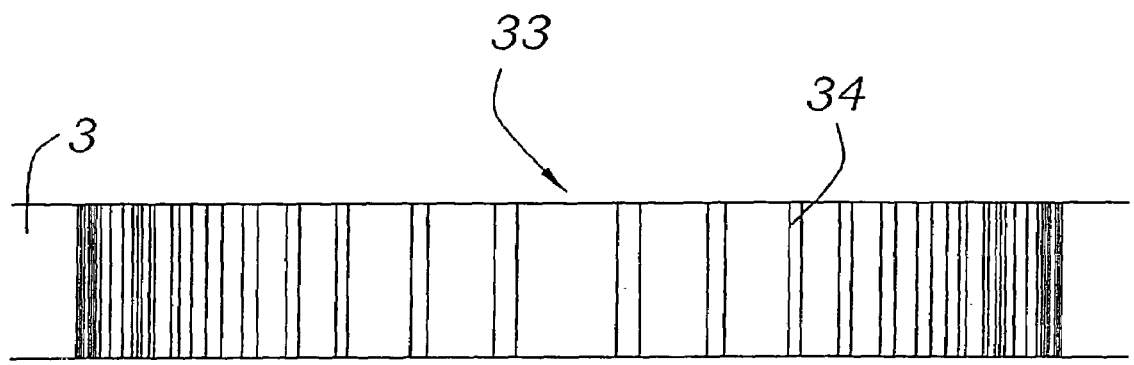
FIG. 6c illustrates an expanded cross-sectional view of the optical waveguide of FIG. 6a wherein the optical element formed in the optical waveguide is a diverging lens.

FIG. 6c illustrates a cross-sectional view of an optical element 33 that is a converging lens. The number of holes pierced through polymer layer 3 is greatest at the outer edges of optical element 33 and decreases toward the center of optical element 33. Therefore, the index of refraction will be highest at the center of the optical element and it will decrease toward the outer edges of the optical element. Light propagating through optical element 33 of FIG. 6c in a direction substantially perpendicular to the plane of the Figure will converge from the low refractive index region (outer edges) into the high refractive index regions (center) thereby causing the optical element to behave like a converging lens.

One advantage of using optical elements of the type shown in FIGS. 6b and 6c is that light propagating from the high refractive index region of polymer layer 3 into the optical element never enters the open air and, therefore, never has an opportunity to propagate out of polymer layer 3. Furthermore, the optical element can be created such that the index of refraction over the pierced area of the polymer layer 3 is always higher than the index of refraction of the substrate 8. Therefore, the light propagating through the optical element will not be drawn into the substrate 8.

Figure 7:
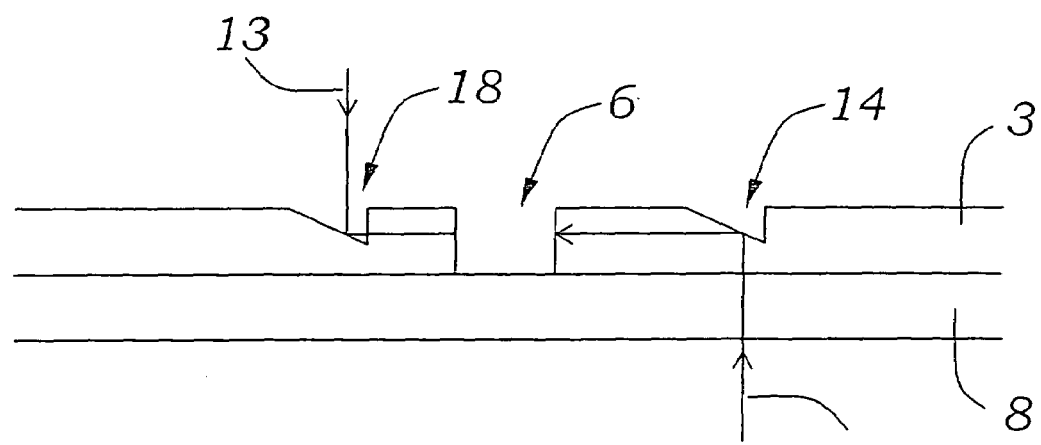
FIG. 7 illustrates a cross-sectional view of the optical waveguide of FIG. 1 showing optical elements 6, 14 and 18 formed therein.

FIG. 7 illustrates a cross-sectional view of the optical waveguide of FIG. 1 having optical elements 6, 14 and 18 formed therein. Optical elements 14 and 18 receive light and project it into polymer layer 3. These elements are designed such that the difference between the index of refraction of air and layer 3 causes light impinging on the elements to be reflected into layer 3 as shown.

Figure 8:
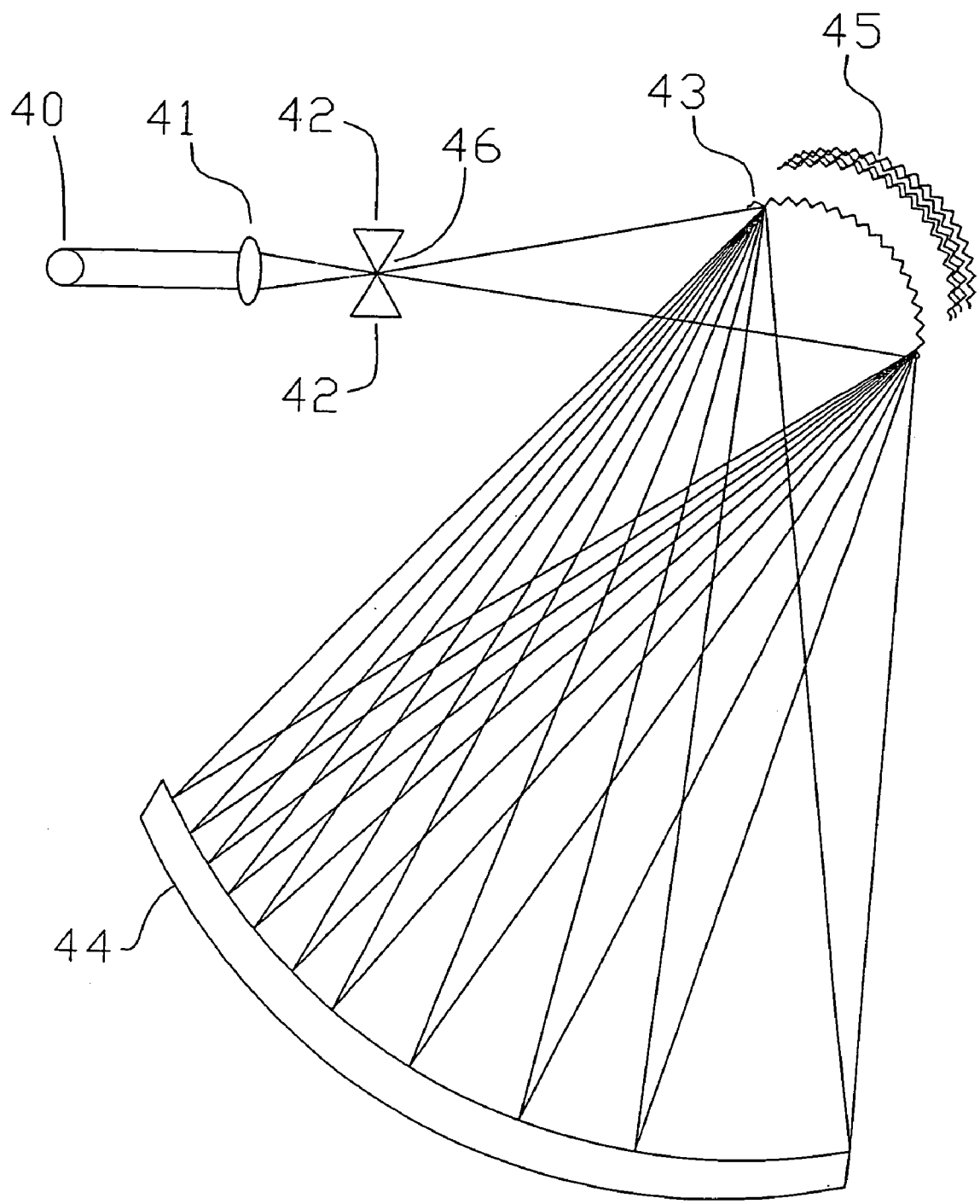
FIG. 8 illustrates a plan view of a spectroscope.

FIG. 8 illustrates a plan view of a spectroscope that can be incorporated into the optical waveguide 1 of the present invention. A light source 40 projects light onto lens 41 that focuses the light onto obstructions 42. The obstructions 42 are separated by a small distance that forms a slit 46 between the obstructions 42. The slit 46 controls the width of the spectral lines formed by curved diffraction grating 43. Diffraction grating 43 is reflective and has a light-absorbing surface 45 behind it that absorbs any light not reflected by diffraction grating 43. The diffraction grating 43 reflects the spectrum of light onto a projection screen 44 and focuses the different wavelengths of light at spatially separated points on screen 44. Diffraction grating 43 can be metallized to increase its efficiency. Screen 44 may be a metallized surface to reflect the spectrum out of the plane of the waveguide or it can incorporate scattering materials or microstructures.

Figure 9:
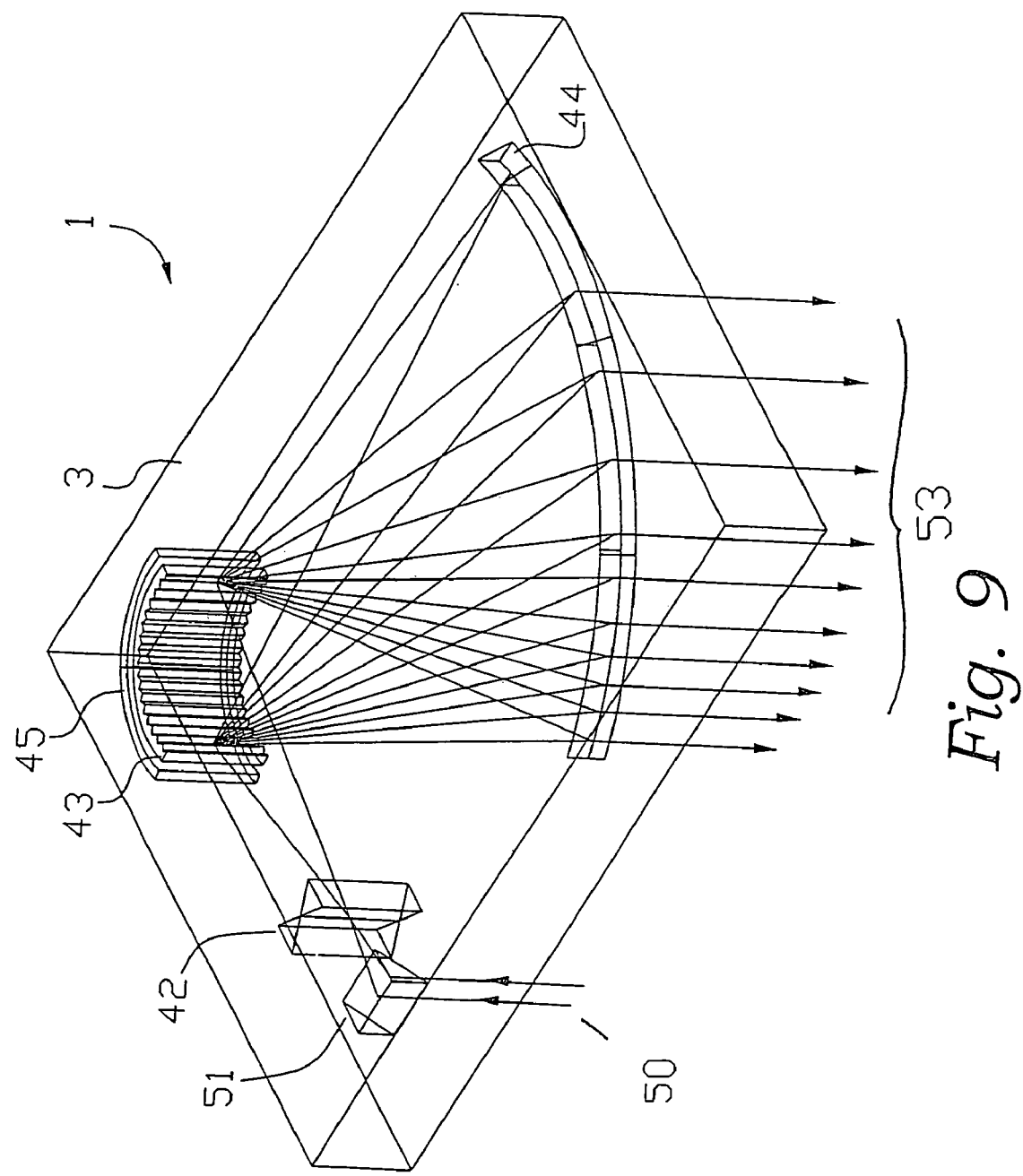
FIG. 9 illustrates a perspective view of the optical waveguide of the present invention having a spectroscope formed therein.

FIG. 9 illustrates the optical waveguide of the present invention having one embodiment of a spectroscope formed therein. A right-angle prism 51 receives light 50 projected onto the bottom surface of the polymer layer 3. Prism 51 deflects the light onto obstructions 42 which have a slit between them. The slit controls the width of the spectral lines formed by curved diffraction grating 43. The diffraction grating 43 reflects the spectrum of the light onto screen 44 and focuses the different colors of the spectrum at spatially separated points on the screen 44. The screen 44 can be a right-angle prism that has a roughened surface such that it functions as a diffuse reflector. Screen 44 reflects the spatially separated colors 53 out of the optical waveguide 1. All of the spectral analysis of the light occurs in polymer layer 3. All of the optical components may be formed by selectively curing polymer layer 3, by reactive ion etching or ion beam milling, or by forming the optical components by replicating a polymer against a master tool and separating the cured replica from the master.

Figure 11:
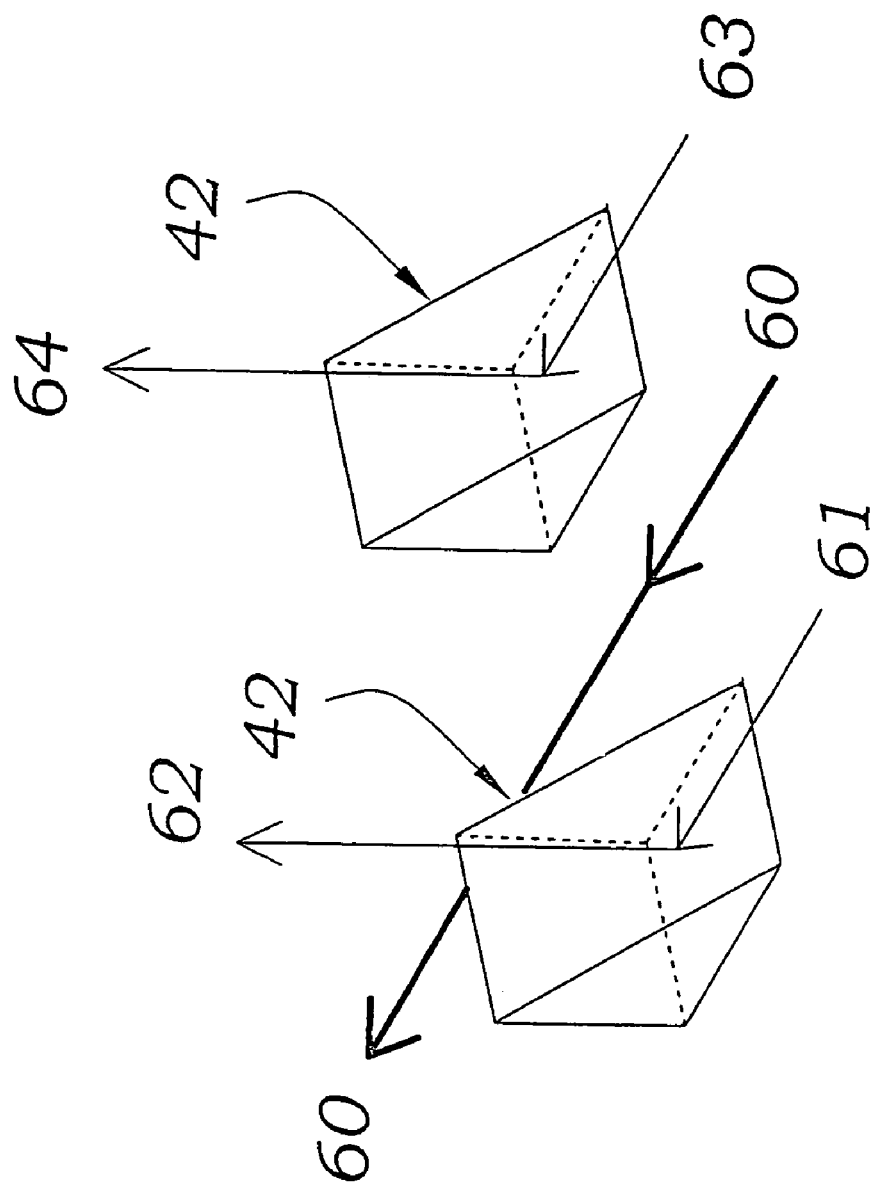
FIG. 11 illustrates a perspective view of obstructions which can be formed in the optical waveguide of the present invention and which affect the propagation of light projected into the optical waveguide.

The holes formed in polymer layer 3 which may correspond to lenses or prisms, for example, have geometries designed to create the desired optical characteristics, as described above with reference to FIGS. 1–6c. Obstructions 42 reflect the light that does not pass through the slit. The obstructions can be made reflective by depositing a reflective material onto the surface of the obstructions. Alternatively, the obstructions 42 can be multi-layer dielectric mirrors having alternating layers of high and low refractive indices, as described in detail below with respect to FIG. 12. The obstructions 42 can also be total internal reflection prisms which reflect all of the light not passing through the slit back up out of polymer layer 3, as shown in FIG. 11. The obstructions 42 can also be filled with a light absorbing material, such as a pigmented polymer, to absorb the light that does not pass through the slit.

Figure 10:
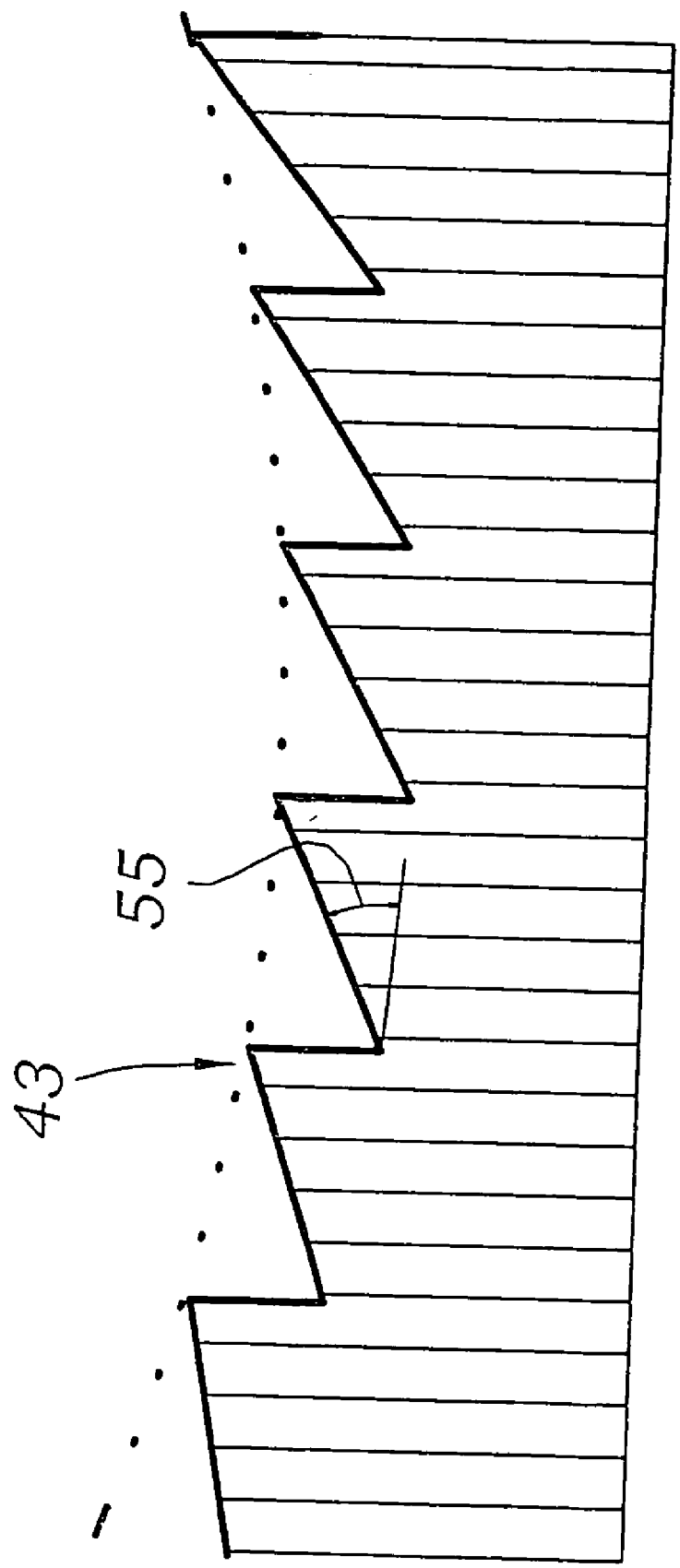
FIG. 10 illustrates a plan view of the diffraction grating of the spectroscope shown in FIG. 9.

Diffraction grating 43 can be made reflective by depositing a reflective material such as aluminum thereon or by forming the diffraction grating of layers of alternating high and low refractive indices such that it behaves like a dielectric mirror as discussed above. A plan view of the diffraction grating 43 is shown in FIG. 10. The light absorbing surface 45 may be a light trap formed by reactive ion etching the cured layer of polymer such that a non-uniform etch in the polymer results. The etching process creates stalactite-type structures that have high length-to-width or aspect ratios. These structures are then covered with a reflective material. The high aspect ratios and the non-uniformity of the structures cause light entering the light trap to be reflected within the light trap until substantially all of the light has been absorbed. Diffraction grating 43 has a curved surface with grooved shapes formed therein. The grooved shapes have a blaze angle 55 that is designed for the period spacing of the wavelengths of light that are to be focused on screen 44.

When it is desirable to perform a spectrum analysis on broadband light, the obstructions 42 shown in FIG. 11 may be used to form the slit. Light 61, 63 which does not pass through the slit is reflected back out of the polymer, layer 3 as indicated by numerals 62 and 64. When narrow band light, such as light generated by an LED, is being projected into the optical waveguide 1, obstructions 42 and diffraction grating 43 can be comprised of multilayer dielectric mirrors that consist of alternating layers of high and low refractive indices.

Figure 12:
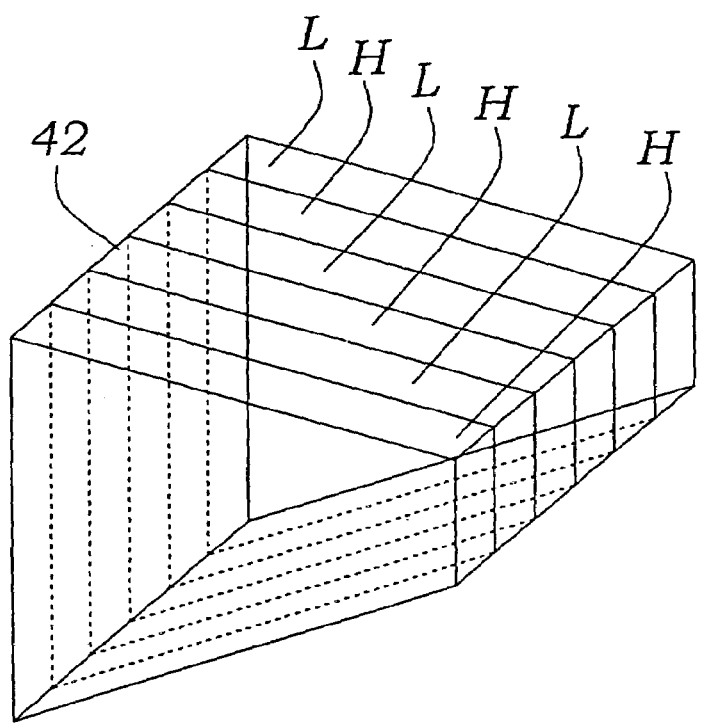
FIG. 12 illustrates an alternative embodiment for the obstructions shown in FIG. 11 wherein the obstruction is a multi-layer dielectric mirror.

FIG. 12 illustrates one of the obstructions 42 comprised of layers of high refractive index material separated by air slots having a refractive index of 1.0. The width of the layers can be substantially ¼ of the wavelength of light being projected onto the obstructions, depending on the need for creating constructive interference or destructive interference effects. Therefore, all of the light impinging on the obstructions will be reflected in accordance with the reflective properties of conventional dielectric mirrors. At each interface of a low and a high refractive index layer, the light will be reflected in phase with the incoming light, thereby creating constructive interference and total reflection. The air slots may be created by masking areas in which it is desirable to have air prior to exposing the liquid polymer to ionizing radiation. The unexposed areas are then rinsed away leaving air slots in the polymer layer 3 which forms the dielectric mirrors. Alternatively, the air slot mirror microstructures can be plasma beam etched or reactive ion etched into polymer layer 3. A master pattern can alternatively be created by conventional UV or deep x-ray exposure of photoresist followed by strong anisotropic development. The optical pathlength through each layer of the air slot microstructures should be substantially equal to half the wavelength of the light in that medium to obtain maximum reflectivity Conventional dielectric mirrors are only desirable when narrow band light is to be analyzed by the spectroscope. When broadband light is to be analyzed, it is desirable to coat the obstructions 42 and the diffraction grating 43 with a reflective material such as aluminum to give them the desired reflective properties.

Figure 13:
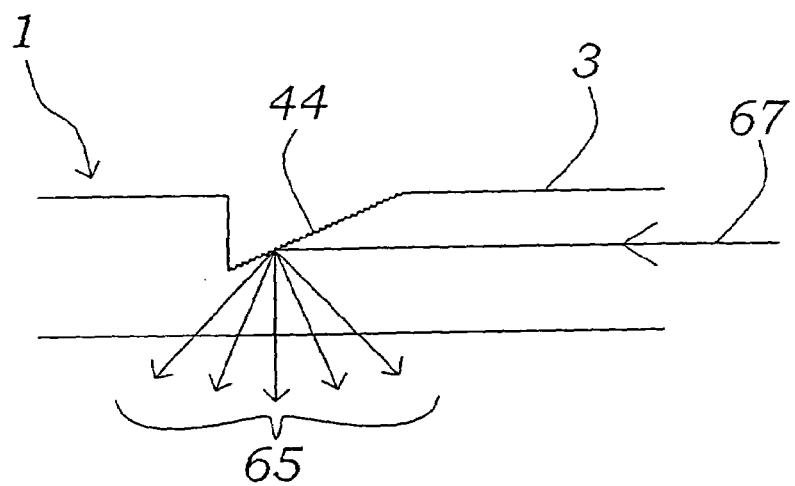
FIG. 13 illustrates a cross-sectional view of the projection screen of the spectroscope formed in the optical waveguide and shown in FIG. 9.

FIG. 13 illustrates a cross-sectional view of one embodiment of projection screen 44 formed in polymer layer 3. In this embodiment the screen 44 consists of a right-angle prism having a roughened surface such that the light reflected onto the screen by the diffraction grating is diffusely reflected back out of the optical waveguide as indicated by arrows 65.

Figure 14A:
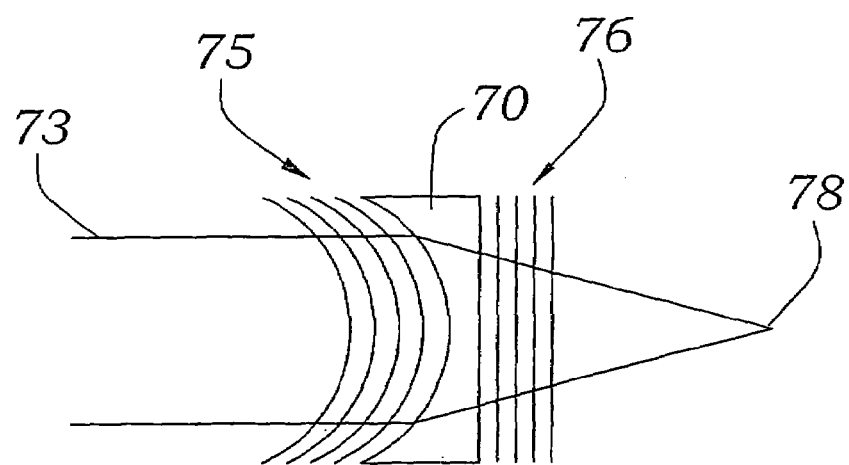
FIG. 14a illustrates a plan view of an optical element formed in the optical waveguide of the present invention which is preceded and followed by anti-reflection structures.
Figure 14B:
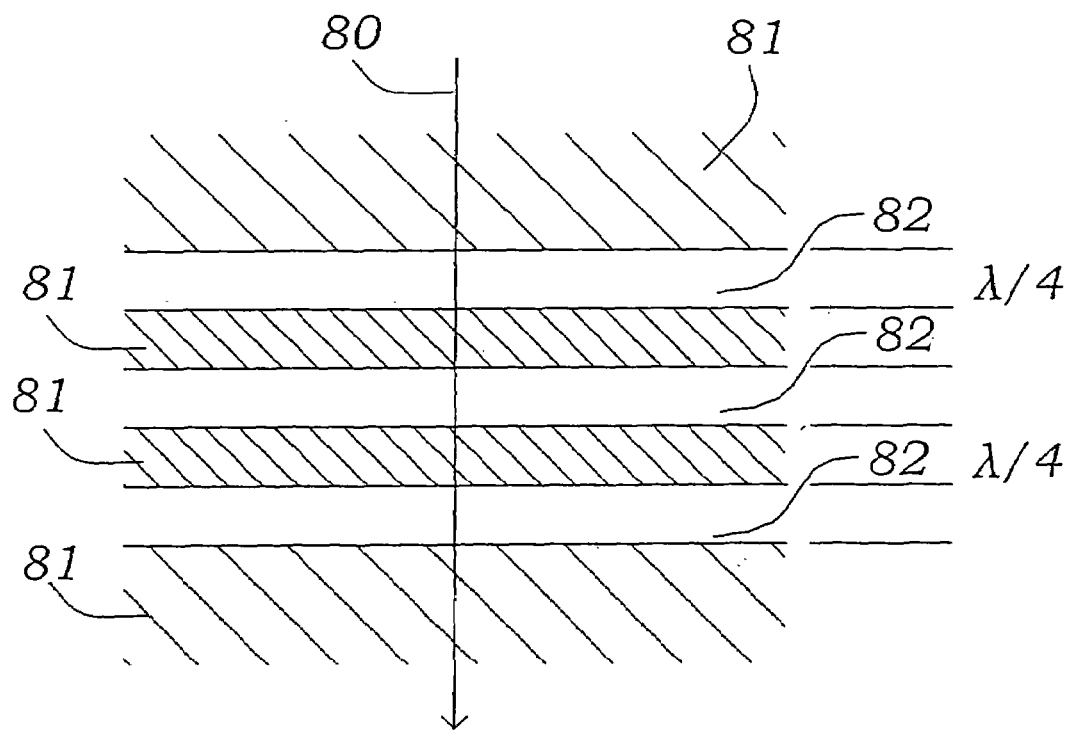

FIG. 14a illustrates an optical element 70 formed in polymer layer 3 of the optical waveguide shown in FIG. 1. The optical element 70 is preceded and followed by antireflection structures 75 and 76, respectively. The anti-reflection structures 75 and 76 eliminate reflection that will otherwise occur at the interfaces of air and polymer. The multi-layer antireflection structures are comprised of alternating layers of high and low refractive indices, as shown in FIG. 14b. The scored areas 81 correspond to the polymer layer 3. The clear areas 82 correspond to slots of air created in the polymer layer 3. The optical pathwidths of the slots of air and layers of polymer 81 are ½ of the wavelength of light being used. Any light reflected at the interfaces of air and polymer will be out of phase 90° with respect to light impinging on the interface. Therefore, the incoming light will destructively interfere with any light reflected at the interfaces, thereby eliminating all reflection.

Figure 15:
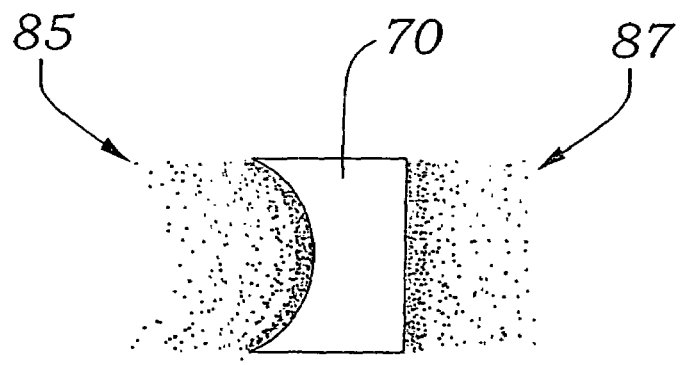
FIG. 15 illustrates an alternative embodiment for creating the anti-reflection structures.

FIG. 15 illustrates an alternative embodiment for the antireflection structure of the present invention. The hole-piercing technique described above with reference to FIGS. 6a–6c is used to create a gradient refractive index in the region of polymer preceding and following the optical element 70. The number of holes pierced through the polymer increases as the distance from the optical element 70 decreases. Therefore, the refractive index of the polymer gradually decreases as the light approaches optical element 70, thereby decreasing reflection at the interface of the optical element 70 and the polymer.

Figure 16:
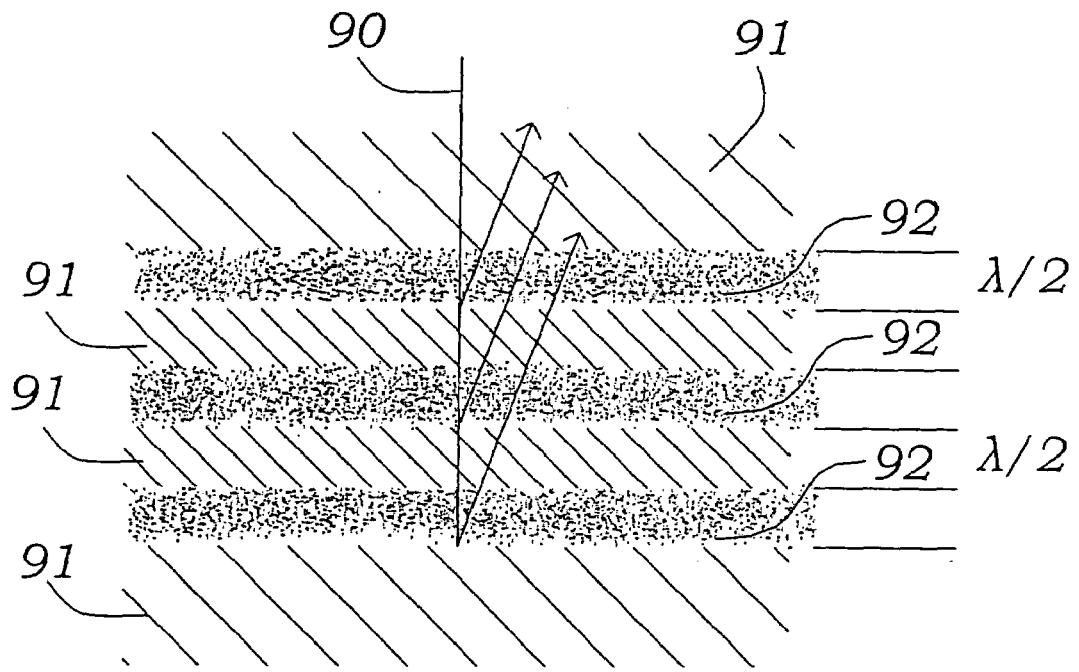
FIG. 16 illustrates one embodiment of the present invention for creating a reflective surface in the optical waveguide by selectively altering the refractive index in certain areas of the optical waveguide.

FIG. 16 illustrates how the hole-piercing technique can be used to create a reflective surface as opposed to the antireflection structure of FIG. 15. Regions 92 in the polymer represent areas in which holes have been pierced through the polymer layer to create regions having lower refractive indices. Regions 91 represent unpierced regions of polymer which have higher indices of refraction. The width of the pierced regions and is equal to ¼ of the wavelength of the light 90 as measured in the lower refractive index of the pierced regions. The spacing between the pierced regions, or the thickness of the unpierced regions, is equal to ½ of the wavelength of the light 90 as measured in the higher refractive index of the unpierced regions. The reflector microstructure of FIG. 16 behaves like a multilayer dielectric minor wherein light is reflected at each interface of the high and low refractive index layers in phase with the light impinging on the interfaces, thereby creating constructive interference and reflection. This hole-piercing technique is particularly suitable for creating reflective surfaces in the optical waveguide when narrow-band light is being analyzed by the optical waveguide.

Once a cured layer of polymer has been created which contains any of the above-mentioned optical elements or other structures, a replication master can be created using conventional nickel electroforming or by energy curing liquid polymer is placed in contact with the cured layer of polymer. The cured layer of polymer and the liquid polymer are then exposed to ionizing radiation which hardens the liquid polymer. When the two layers of cured polymer are separated, the replica represents a master from which additional polymer optical waveguides can be produced. Accordingly, the present invention allows polymer optical waveguides to be mass produced.

Figure 17:
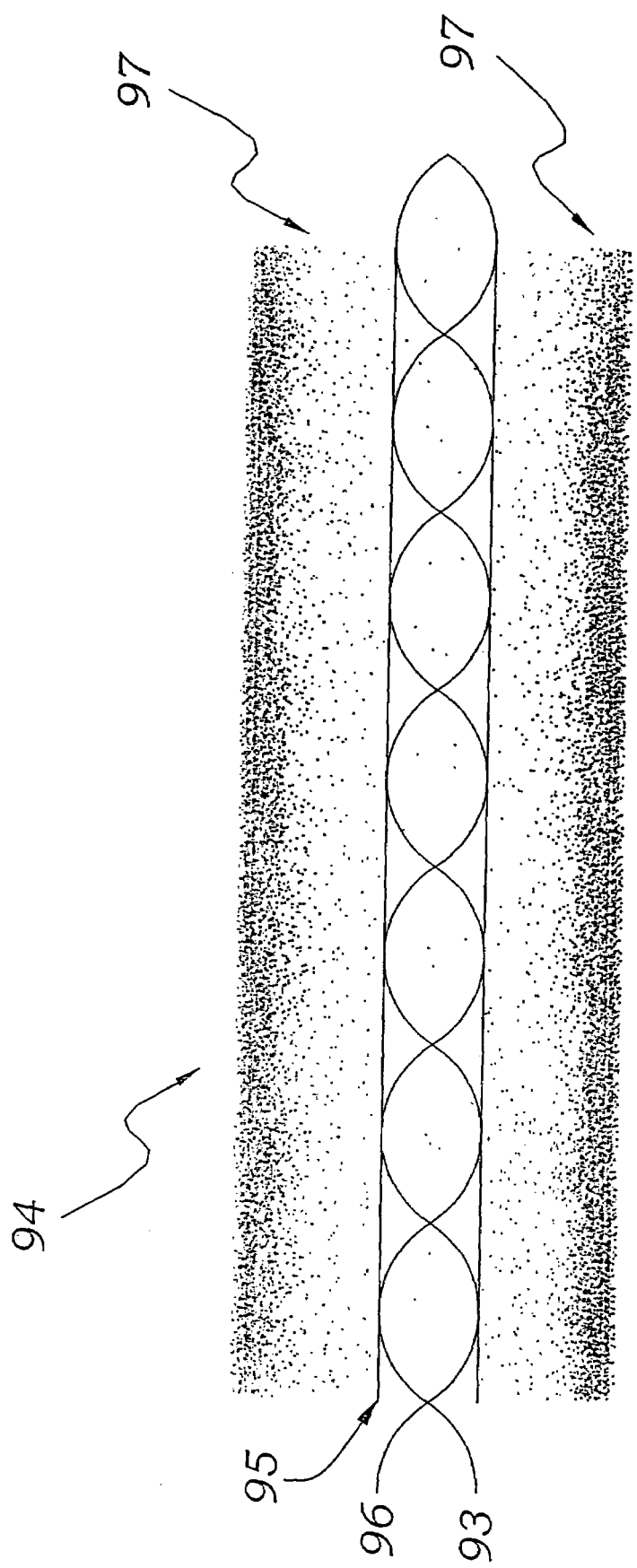
FIG. 17 illustrates one embodiment for confining the path of light within the optical waveguide of the present invention by selectively altering the refractive index in certain areas of the optical waveguide.
Figure 18:
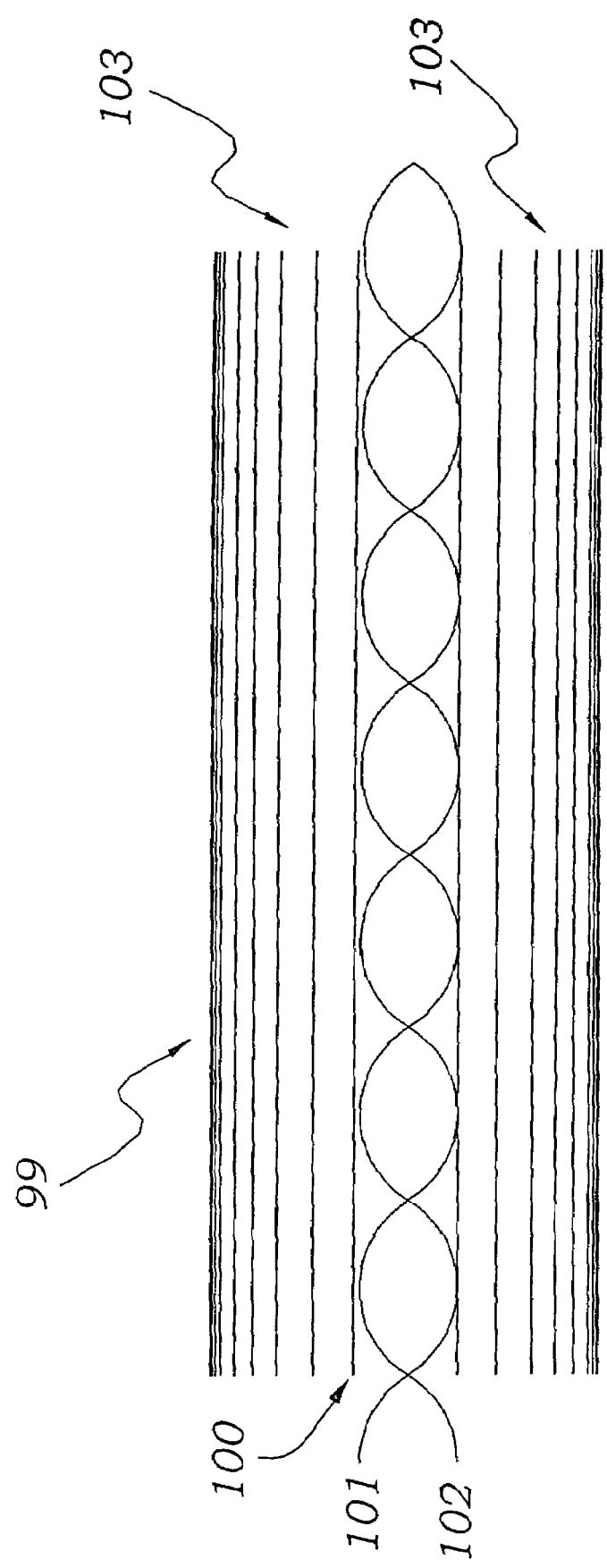
FIG. 18 illustrates a plan view of another embodiment for confining the path of light within the optical waveguide by altering the refractive index of light in certain areas of the optical waveguide.

FIGS. 17 and 18 illustrate top plan views of waveguide channels for guiding light within the plane of a polymer layer 94 in phase coherence. The surface of polymer layer 94 is pierced with holes 97 having diameters which are small in comparison to the wavelength of the light (less than one quarter wavelength) by using the hole piercing technique described above. The unpierced area of the polymer 95 constitutes a waveguide channel which has a high refractive index. The number of holes pierced through the polymer layer 94 increases with increasing distance form the center of the waveguide channel. Therefore, the index of refraction of the waveguide gradually decreases toward the outer edges of the waveguide. As light waves 93 and 96 propagate into the waveguide from the directions shown, the light waves move from the regions of high refractive index into the regions of low refractive index. As the light waves move into the regions of low refractive index 97 the light waves gradually refocus into the high refractive index region. As the light waves pass through the high refractive index region into the low refractive index region, the light waves are once again refocused into the high refractive index region. By providing a gradient refractive index in the manner shown, the light waves will propagate through the waveguide in phase coherence.

FIG. 18 shows an alternative embodiment for guiding light within the plane of the optical waveguide. A gradient refractive index is created by, piercing slots 103 through the polymer layer 99. The width of the slots is on the order of less than one quarter of a wavelength of light. The number of slots in the polymer layer increases with increasing distance from the center of the waveguide, thereby creating a gradient refractive index. Light waves 101 and 102 propagate through the waveguide in phase coherence in the manner described above with respect to FIG. 17. The slots may be created by masking the liquid polymer during exposure to curing radiation to selectively cure certain areas and then by rinsing away the uncured areas. Alternatively, the slots may be created by ion beam milling.

The waveguides of FIGS. 17 and 18 operate in a manner analogous to fiber optics. However, the waveguides of FIGS. 17 and 18 represent structures which can be embossed from a master whereas fiber optics must be individually created.

Figure 19:
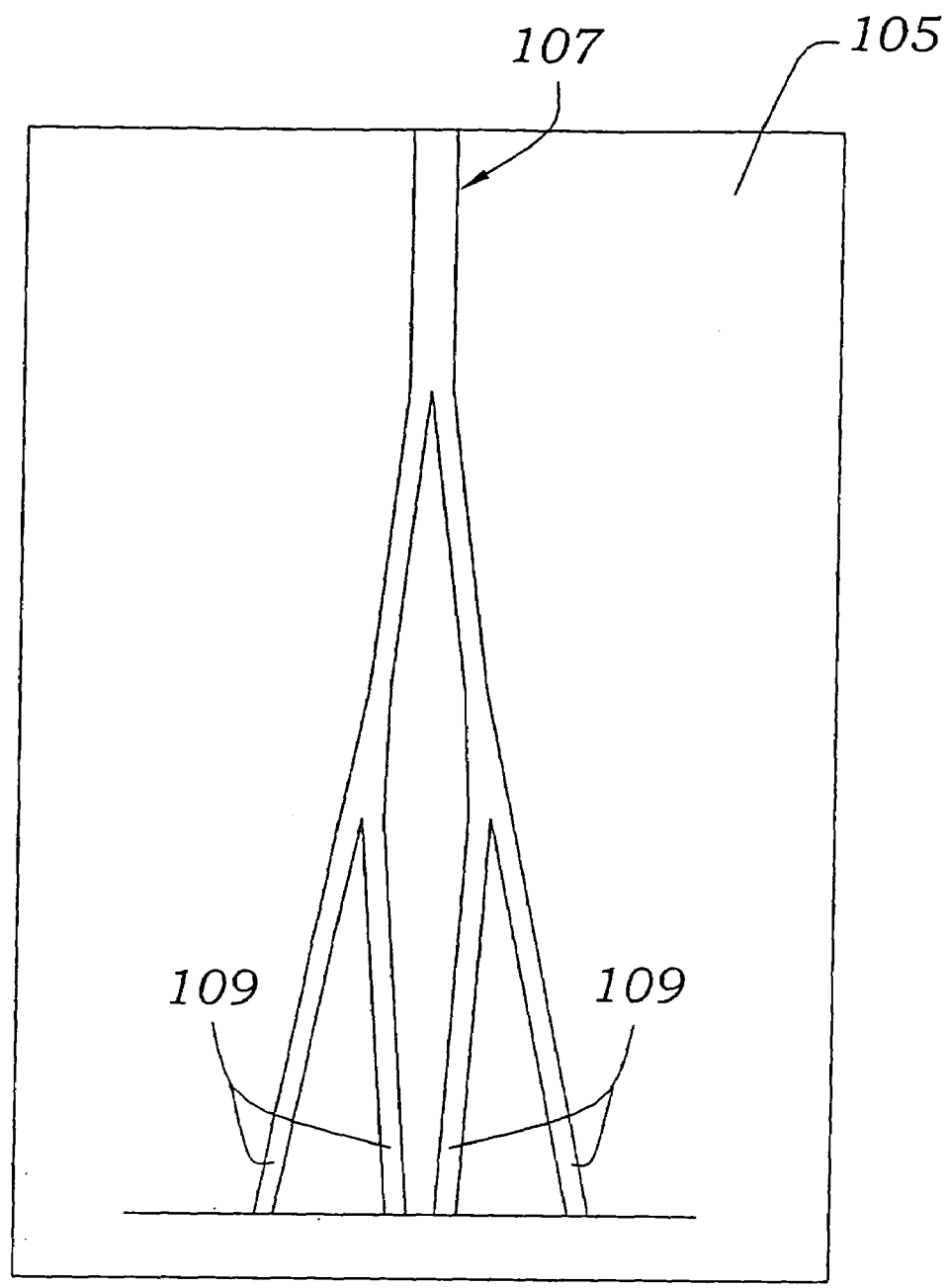
FIG. 19 illustrates a plan view of one embodiment of the optical waveguide of the present invention having an optical element formed therein which can function as a beam splitter or as a combiner.

FIG. 19 illustrates in plan view an example of one type of embossed structure which can be created using either of the waveguide channels of FIGS. 17 and 18. Embossed structure 105 can be a splitter or a combiner depending on the direction in which the light is propagating, i.e., depending on how it is being utilized. When light is propagating from waveguide channel 107 into bifurcated waveguide channels 109, the structure operates as an optical splitter which sends all frequencies of light being carried by waveguide channel 107 to each of the bifurcated waveguide channels 109. At each bifurcation, the angle of bifurcation must be extremely small so that the energy of the light is evenly distributed to each waveguide channel. When light is propagating from the bifurcated waveguide channels into waveguide channel 107, the light will be combined and the structure operates as an optical combiner.

Figure 20:
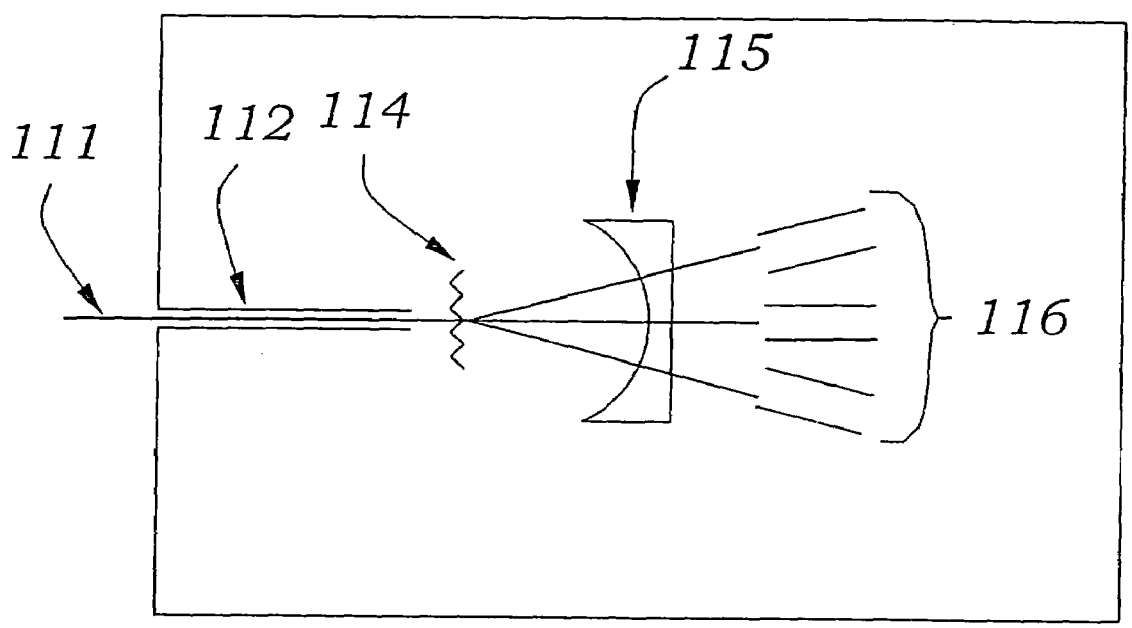
FIG. 20 illustrates a plan view of the optical waveguide of the present invention having an optical demultiplexer formed therein.

FIG. 20 illustrates a demultiplexer which utilizes the waveguide channels of FIGS. 17 and 18. Light 111 propagating through waveguide channel 112 impinges on the diffraction grating 114 which spatially separates the frequencies of light. The different frequencies of light are then focused by lens 15 at spatially separated points. A separate waveguide channel is located at each point to receive a particular frequency of light.

Figure 21:
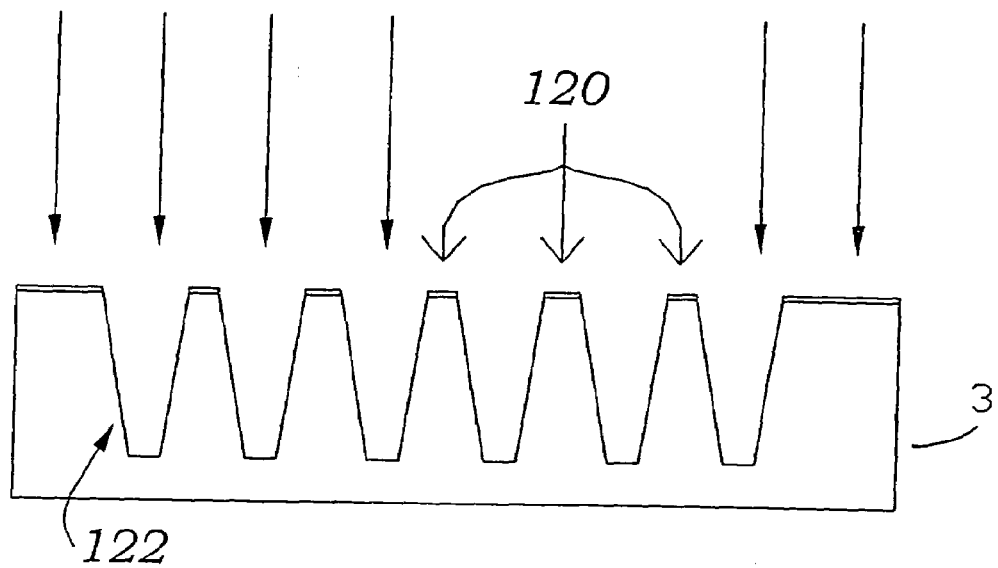
FIG. 21 illustrates the hole-piercing technique of the present invention.

FIG. 21 illustrates the hole-piercing technique of the present invention. After polymer layer 3 of FIG. 1 has been cured by exposure to curing radiation such as ultraviolet light and the optical elements have been formed therein, by masking during exposure, holes are pierced in the hardened polymer in areas where it is desirable to create regions having gradient refractive indices. A mask of chrome spots 120 is formed on the surface of the polymer by electron beam lithography. Electron beam lithography allows features as small as 180 manometers to be formed on the polymer. Reactive ion etching or ion beam milling is then used to etch holes 122 into the polymer.

Figure 22:
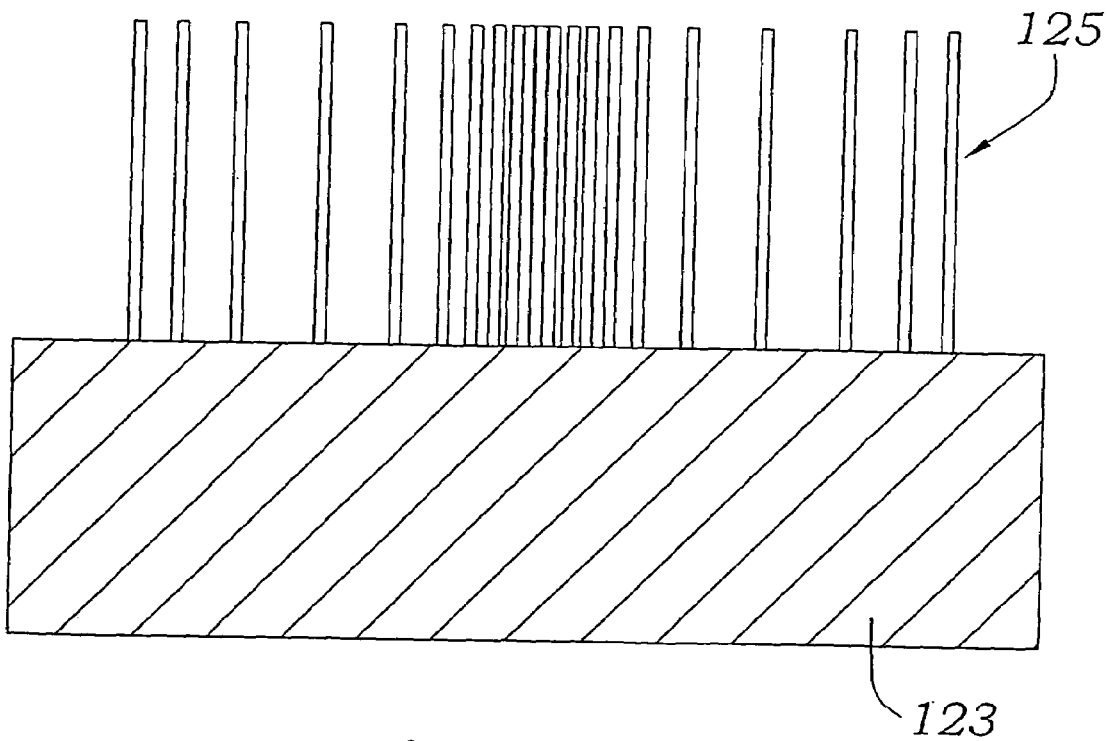
FIG. 22 illustrates a cross-section of a master embossed from the layer shown in FIG. 21 having holes pierced therein.

FIG. 22 illustrates a cross-section of a master 123 embossed from the etched polymer layer 3 shown in FIG. 21. The master 123 is produced by first pouring liquid polymer (not shown) over hardened polymer layer 3 of FIG. 21 and then exposing the liquid polymer to ultraviolet light. Posts of hardened polymer 125 are formed which have diameters which are generally less than one quarter of the wavelength of light. FIG. 6b represents a cross-section of an embossment created by pouring liquid polymer over the master shown in FIG. 22, exposing it to ultraviolet light, and separating the embossment from the master.

Figure 23:
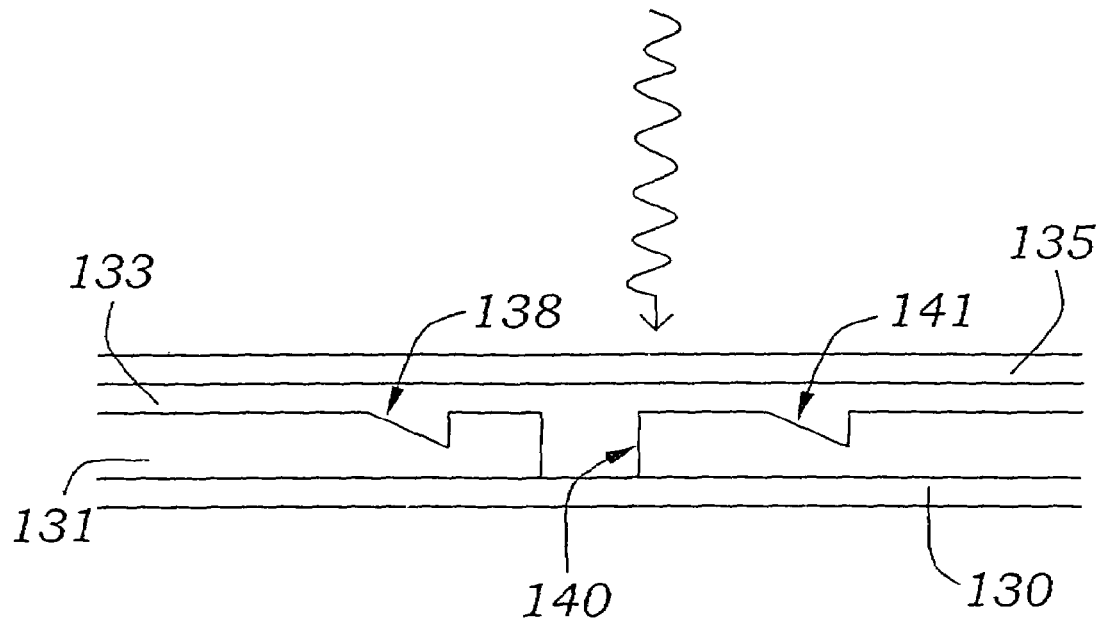
FIGS. 23 and 24 illustrate the process for creating a master in accordance with the present invention and for generating embossments therefrom.
Figure 24:
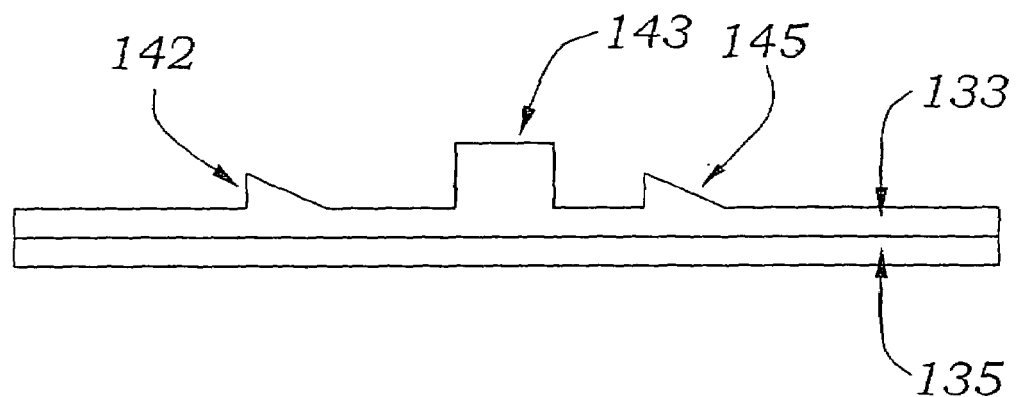

FIGS. 23 and 24 illustrate the process for creating a master. The masking and exposure techniques discussed above are first used to produce a cured layer of polymer 131 having optical elements 138, 140 and 141 formed therein. Polymer layer 131 is preferably bonded to a substrate 130 such as polyester which gives the structure mechanical stability. A variety of techniques can be used to create the optical elements 138, 140 and 141. Some of the optical elements can be formed by simply masking the liquid polymer during exposure to curing radiation and then rinsing away the uncured areas of the polymer after the exposure step. It may be necessary to use other techniques to create some of the other optical elements due to their geometries. For example, once the polymer layer 131 has been cured, optical elements can be formed therein by covering the polymer layer 131 with a layer of photoresist (not shown), exposing and developing certain areas of the photoresist layer, and using reactive ion etching or ion beam milling to etch the particular optical element into the polymer layer. As discussed above, it may be necessary to deposit a chrome mask (not shown) on the surface of cured polymer layer 131 and then use ion beam milling to etch the polymer away in the unmasked areas of the cured polymer 131. In short, the technique used to create a particular optical element will depend on the geometry of the optical element. Generally, the optical elements will be created by the simplest and most economical means possible. Furthermore, mastering need not occur in a curable polymer. Other materials, such as quartz or silicon can be processed with masking and reactive ion etching or ion beam milling to create the original. This piece or replicas of it in polymer or nickel, for example, then can function as the master.

Once the optical elements have been formed, a layer of liquid polymer 133 is placed in contact with cured polymer layer 131 as shown in FIG. 23. A substrate 135, preferably polypropylene, is placed in contact with liquid polymer 133 and the entire structure is exposed to curing radiation such as ultraviolet light which causes liquid polymer layer 131 to become cured and bond to substrate 135. The structure comprised of substrate 135 and cured polymer layer 133 is then separated from the structure comprised of substrate 130 and polymer layer 131. The structure comprised of substrate 135 and cured polymer layer 133, which is shown in FIG. 24, may be used as a master from which embossed optical waveguides can be generated. It is also possible to use the structure shown in FIG. 23 comprised of layers 130 and 131 as the master if the features formed in layer 131 are negatives of the features desired to be formed in the embossed optical waveguide. A metal master can be produced from the structure shown in FIG. 24 by electroplating the structure with a metal such as nickel. Once the master, shown in FIG. 24, has been produced, an embossed optical waveguide can be generated therefrom by the same method discussed above with respect to FIG. 23. A layer of liquid polymer (not shown) is placed in contact with the master and a substrate, preferably polypropylene, is placed in contact with the liquid polymer. The entire structure (not shown) is then exposed to curing radiation such as ultraviolet light which causes the liquid polymer to harden and bond to the substrate. The embossed optical waveguide is then separated from the master. Alternative replication methods, such as compression molding and injection molding of polymer materials, can also be used.

In summary, an optical waveguide having optical elements and other optical structures formed therein can be created by the methods discussed above which will analyze light in a predetermined manner. Once the optical elements and structures are formed in the waveguide, a negative of the device is produced. This negative is a master of the light control device from which replicas can be readily made by a variety of means. Alternatively, the negative can be electroplated to produce a metal master.

Also, the optical elements formed in the initial optical waveguide can be negatives of the elements to be formed in the embossed optical waveguide such that the embossed optical waveguide can be generated directly from the initial optical waveguide. The initial optical waveguide can be electroplated to create a metal master from which the optical waveguide replicas can be produced.

Therefore, it is not necessary to individually form the optical elements of each optical waveguide. Either during or after production of the embossments, subsequent layers of material can be added to the embossment to give the embossment the desired optical qualities and mechanical stability. Preferably, a layer of polypropylene is bonded to the embossed optical waveguide. However, any material which is suitable for use with the present invention and which has the desired optical properties can be used for this purpose. If the replicated optical waveguide is mechanically stable, then it may not be necessary to add additional layers or to provide a substrate.

Figure 25:
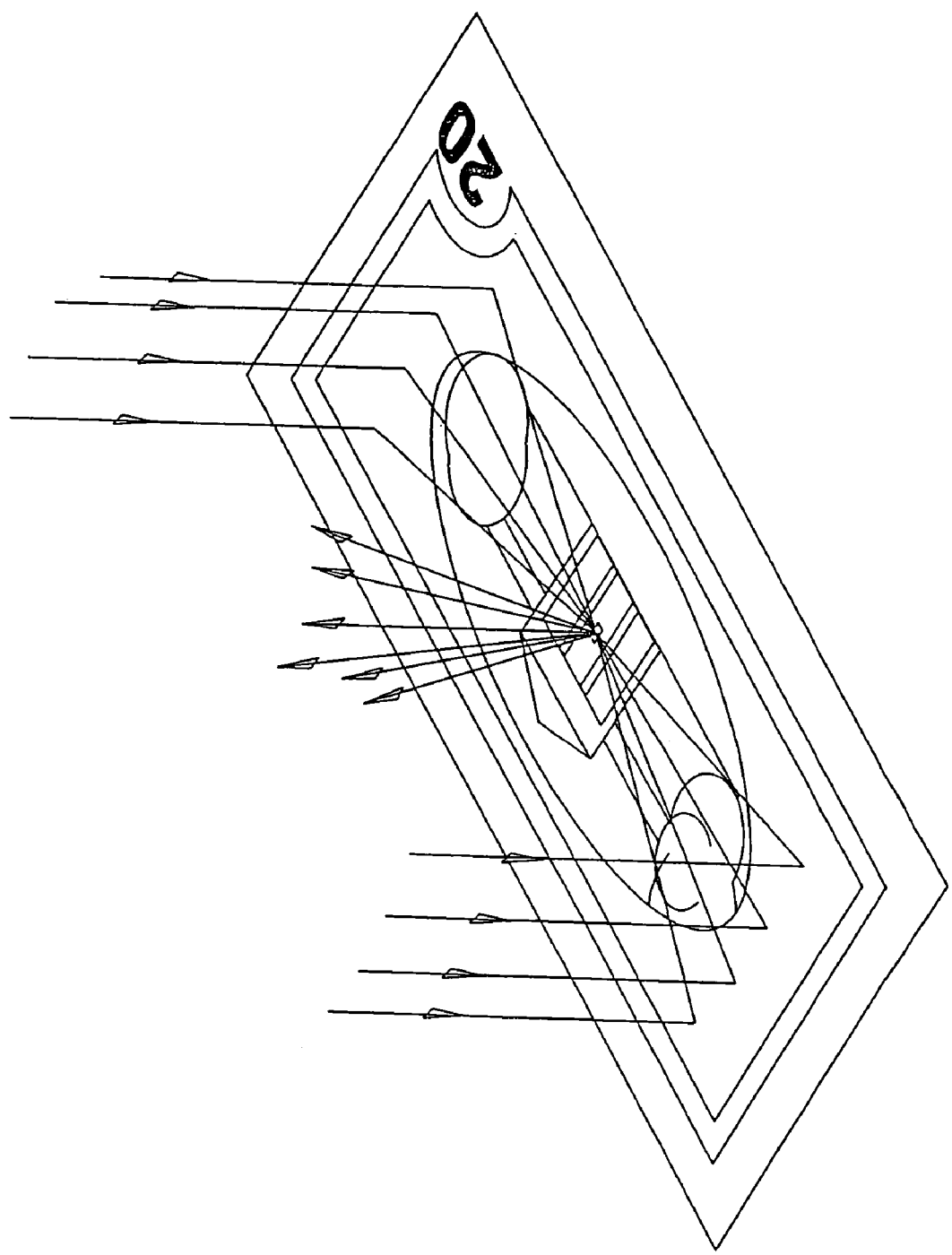
FIG. 25 illustrates an isometric view of a further embodiment of the present invention in which planar optics are incorporated into polymer substrates to form a counterfeit resistant document substrate.

As illustrated in FIG. 25, the planar optics of the present invention can also be incorporated into polymer substrates for creating secure documents. For example, a planar optic system that collects incident light illuminating the surface of a document can be directed into a waveguide core and focused to a smaller area before being emitted back out through the surface of the document. This geometrical concentration of the light results in an increase in its intensity, producing an effect similar to embedding a light source in the document at that location. The geometrical concentration is a constant factor, so the region of emission will appear to be substantially brighter than the surrounding document under a wide range of lighting conditions. Other image transfer, image scrambling, and illumination control can be accomplished by suitable collection, waveguiding, and emission elements incorporated into document substrates. These optical systems can be embedded entirely within a polymer system, rendering them difficult or impossible to disassemble to produce tooling to create counterfeits therefrom.

Furthermore, these optical systems can be designed to interact with printed or metallized patterns added to the outer surfaces of the material such that the presence of a printed pattern, for example causes frustrated total internal reflection (and subsequent disconnection of the light from the following optical system elements) while the absence of a printed pattern enables connection of the light to subsequent optical system elements by total internal reflection. The contact pattern of a fingerprint could be substituted for a printed pattern to enable interaction of the optical system with a user's fingerprint for identification, authentication, and verification functions. In a similar manner a metallization pattern can be used to enable optical interconnections that would not be present without the metallization pattern or with an altered or different pattern. Additionally, a waveguide planar optic system according to the subject invention can be designed and embedded in the substrate of a credit card or other card bearing an embossed pattern of numbers, symbols, or characters such that the embossment of the card modifies the output pattern or properties of the waveguide system in a manner corresponding to the embossed information, such as by breaking specific waveguide connections. The authenticity of such a card can then be verified by checking the embossed information against the waveguide system properties. If the two don't match then the card has been tampered with, such as by alteration of the embossed numbers on the card.

The present invention is not limited to the types of optical elements and structures which can be formed in the optical waveguide. The techniques described above for forming the optical elements and structures in the slab waveguide can be used to create optical elements and structures having virtually any type of geometry. Also, the present invention is not limited with regard to the types of materials which can be used to create the initial waveguide or the subsequent embossments. Any materials which have the desired optical as well as mechanical properties can be used to create the light control device of the present invention. Furthermore, although the soft embossing process is preferable for replicating the optical waveguides, it is also possible to use a hard embossing process, such as extrusion embossing, to generate the embossments.

We claim:

1. A method for creating an optical waveguide, said method comprising the steps of:
    creating a waveguide master having the geometrical form of at least one optical element formed therein;
    generating an embossed optical waveguide from said master, said embossed optical waveguide being a negative of said master, said embossed optical waveguide having at least one refractive optical element formed therein which corresponds to and is a negative of the geometrical form of said at least one optical element formed in said master, said embossed optical waveguide comprised of a polymer material, said polymer material having a first index of refraction, wherein said at least one refractive optical element is formed in said polymer material, wherein said at least one refractive optical element formed in said polymer material creates a local modification of the refractive index of said polymer material, wherein said local modification of the refractive index of said polymer material causes light refracted by said at least one optical element formed in said polymer material to be operated on in a predetermined manner by said at least one optical element formed in said polymer material.

2. A method for creating an optical waveguide according to claim 1 further including the step of:
    bonding a substrate to said polymer material, said substrate having known optical and mechanical characteristics, such that when light projected into said embossed optical waveguide impinges on said substrate it is reflected such that it continues to propagate in said embossed optical waveguide.

3. A method for creating an optical waveguide according to claim 1 wherein said master is comprised of metal.

4. A method for cleating an optical waveguide according to claim 1 wherein said embossed optical waveguide is generated by placing a layer of liquid photopolymer in contact with said master, exposing said liquid photopolymer to curing radiation which cures the liquid photopolymer, and separating said cured photopolymer from said master, said cured photopolymer corresponding to said polymer material.

5. A method for creating an optical waveguide according to claim 4 wherein prior to exposing said layer of liquid photopolymer to curing radiation, said substrate is placed in contact with said layer of liquid photopolymer such that during exposure of said liquid photopolymer to the curing radiation, said substrate bonds to the cured layer of photopolymer.

6. A method for creating an optical waveguide according to claim 1, wherein said at least one refractive optical element formed in said polymer material Is formed therein by selectively altering the refractive index of a portion of the polymer material.

7. A method for creating an optical waveguide according to claim 1, wherein said at least one refractive optical element formed in said polymer material is formed therein by creating one or more holes in the polymer material.

8. A method for creating an optical waveguide according to claim 7, wherein at least one of the holes in the polymer material is created through use of reactive ion etching, ion beam milling, electron beam lithography, or a chemical wash, or combinations of two or more thereof.

9. A method for creating an optical waveguide said method comprising the steps of:
    creating a waveouide master having the geometrical form of at least one optical element formed therein;
    generatin an embossed optical waveguide from said master, said embossed optical waveguide being a negative of said master, said embossed optical waveguide having at least one optical element formed therein which coresoonds to and is a negative of the geometrical form of said at least one optical element formed in said master, said embossed optical waveguide comprised of a polymer material, said polymer material having a first index of refraction, wherein said at least one optical element is formed in said polymer material, wherein said at least one optical element formed in said polymer material creates a local modification of the refractive index of said polymer material, wherein said local modification of the refractive index of said polymer material causes light impinging on said at least one optical element formed in said polymer material to be operated on in a predetermined manner by said at least one optical element formed in said polymer material
    wherein said step of creating said master comprises the step of exposing a layer of liquid photopolymer to curing radiation through a mask, wherein the mask controls the exposure of said liquid photopolymer such that certain parts of said liquid photopolymer become cured and certain parts of said liquid photopolymer remain uncured, wherein the uncured parts are subsequently removed for said master to be used to form said at least one refractive optical element in said optical waveguide.

10. A method for creating an optical waveguide according to claim 9 wherein said step of creating said master further comprises the step of reactively ion etching certain parts of said cured photopolymer to form additional optical elements therein.

11. A method for creating an optical waveguide according to claim 9 wherein said step of creating said master further comprises the step of ion beam milling certain parts of said cured photopolymer to form additional optical elements therein.

12. A method for creating an optical waveguide according to claim 9 wherein after the uncured parts of said liquid photopolymer have been removed said master is electroplated with metal to create a metal master.

13. A method for creating an optical waveguide said method comprising the steps of:
    creating a waveguide master having the geometrical form of at least one optical element formed therein;
    generating an embossed optical waveguide from said master, said embossed optical waveguide being a negative of said master, said embossed optical waveguide having at least one optical element formed therein which corresponds to and is a negative of the geometrical form of said at least one optical element formed in said master, said embossed optical waveguide comprised of a polymer material, said polymer material having a first index of refraction, wherein said at least one optical element is formed in said polymer material, wherein said at least one optical element formed in said polymer material creates a local modification of the refractive index of said polymer material, wherein said local modification of the refractive index of said polymer material causes light impinging on said at least one optical element formed in said polymer material to be operated on in a predetermined manner by said at least one optical element formed In said polymer material wherein said step of creating said master comprises the step of exposing a polymeric resist to a pattern of exposing radiation, wherein the pattern of exposure of said resist after its solubility in a developing solution, wherein a pattern of resist is subsequently removed by development for said master to be used to form said at least one optical element in said optical waveguide.

14. A method for creating an optical waveguide according to claim 13 wherein said step of creating said master further comprises the step of reactively ion etching certain parts of said photoresist to form additional optical elements therein.

15. A method for creating an optical waveguide according to claim 13 wherein said step of creating said master further comprises the step of ion beam milling certain parts of said photoresist to form additional optical elements therein.

16. A method for creating an optical waveguide according to claim 13 wherein after the pattern of photoresist has been developed said master is electroplated with metal to create a metal master.

17. A method for creating an optical waveguide a portion of said method comprising the steps of:
   creating a waveguide master having the geometrical form of at least one optical element formed therein;
   generating an embossed optical waveguide from said master, said embossed optical waveguide being a negative of said master, said embossed optical waveguide having at least one optical element formed therein which corresponds to and is a negative of the geometrical form of said at least one optical element formed in said master, said embossed optical waveguide comprised of a polymer material, said polymer material having a first index of refraction, wherein said at least one optical element is formed in said polymer material, wherein said at least one optical element formed in said polymer material creates a local modification of the refractive index of said polymer material, wherein said local modification of the refractive index of said polymer material causes light impinging on said at least one optical element formed in said polymer material to be operated on in a predetermined manner by said at least one optical element formed in said polymer material wherein said step of creating said master comprises the step of exposing a portion of a layer of liquid photopolymer to curing radiation and controlling the exposure of said liquid photopolymer such that a portion of said liquid photopolymer becomes cured and another portion of said liquid photopolymer remains uncured, wherein an uncured part is subsequently removed for said master to be used to form said at least one optical element in said optical waveguide.

* * * * *